(12) United States Patent
Elford et al.

(10) Patent No.: US 9,742,172 B2
(45) Date of Patent: Aug. 22, 2017

(54) MEDIALINK INTERCONNECTION BOX

(71) Applicant: CenturyLink Intellectual Property LLC, Denver, CO (US)

(72) Inventors: Michael L. Elford, Calhoun, LA (US); Diana L. Unser, Lakewood, CO (US); Pete A. Kawamoto, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/971,243

(22) Filed: Dec. 16, 2015

(65) Prior Publication Data

US 2016/0226231 A1 Aug. 4, 2016

Related U.S. Application Data

(60) Provisional application No. 62/109,757, filed on Jan. 30, 2015.

(51) Int. Cl.
*H04B 1/03* (2006.01)
*H05K 5/02* (2006.01)
(Continued)

(52) U.S. Cl.
CPC ............. *H02G 3/088* (2013.01); *H02G 9/02* (2013.01); *H02G 3/0493* (2013.01)

(58) Field of Classification Search
CPC ......... H02G 3/088; H02G 9/02; H02G 3/0493
(Continued)

(56) References Cited

U.S. PATENT DOCUMENTS 2,754,101 A 7/1956 Haworth et al.
4,034,567 A 7/1977 Roggen
(Continued)

FOREIGN PATENT DOCUMENTS

CA 2337284 8/2002
FR 2750717 1/1998
(Continued)

OTHER PUBLICATIONS

International Search Report and Written Opinion prepared by the U.S. Patent and Trademark Office as International Search Authority in PCT International Patent Application No. PCT/US2014/026325, mailed Aug. 8, 2014; 12 pages.
(Continued)

*Primary Examiner* — Hung S Bui
(74) *Attorney, Agent, or Firm* — Swanson & Bratschun, L.L.C.

(57) ABSTRACT

Novel tools and techniques are provided for implementing MediaLink Interconnection Boxes ("MIBs"). In some embodiments, a plurality of MediaLink Interconnection Boxes ("MIBs") or media interconnection devices, which may be disposed throughout a recreational vehicle ("RV") park or other bulk service provider application sites, or the like, may serve as demarcation units designed to each provide an accessible indoor or outdoor interface where long-term or temporary/transient customers can directly connect to land line service (e.g., POTS service), video or television service, and/or Ethernet or Internet services provided by one or more service providers. Fiber-to-Drop-Point ("FTDP") and/or point-to-point fiber insertion within a passive optical network ("PON") communications system may be implemented using apical conduit systems in conjunction with the MIBs. Alternatively, traditional ground-based or buried line interconnections (or a combination of the apical conduit system and such traditional interconnections) may be implemented in conjunction with the MIBs.

29 Claims, 17 Drawing Sheets

(51) Int. Cl.
   *H02G 3/08* (2006.01)
   *H02G 9/02* (2006.01)
   *H02G 3/04* (2006.01)

(58) Field of Classification Search
   USPC ....... 361/752, 814, 807, 809, 810, 800, 825, 361/826
   See application file for complete search history.

(56) References Cited

U.S. PATENT DOCUMENTS

| | | | |
|---|---|---|---|
| 4,329,083 A | 5/1982 | Parkinson | |
| 4,815,814 A | 3/1989 | Ulijasz | |
| 5,239,129 A * | 8/1993 | Ehrenfels | H02B 1/28 174/50 |
| 5,313,546 A | 5/1994 | Toffetti | |
| 5,528,684 A * | 6/1996 | Schneider | H01R 9/0506 379/412 |
| 5,566,622 A | 10/1996 | Ziaylek, Jr. et al. | |
| 5,583,492 A | 12/1996 | Nakanishi | |
| 5,606,606 A * | 2/1997 | Schneider | H02G 15/117 348/E7.053 |
| 5,760,706 A | 6/1998 | Kiss | |
| 5,879,109 A | 3/1999 | Diermeier et al. | |
| 6,099,080 A | 8/2000 | Hirashita et al. | |
| 6,272,346 B1 | 8/2001 | Fujinami | |
| 6,371,691 B1 | 4/2002 | Finzel et al. | |
| 6,499,410 B1 | 12/2002 | Berardi | |
| 6,503,025 B1 | 1/2003 | Miller | |
| 6,807,355 B2 | 10/2004 | Dofher | |
| 6,829,424 B1 | 12/2004 | Finzel et al. | |
| 6,866,448 B2 | 3/2005 | Finzel et al. | |
| 6,990,192 B1 * | 1/2006 | Denovich | H04N 7/104 379/326 |
| 7,050,683 B2 | 5/2006 | Dofher | |
| 7,095,930 B2 | 8/2006 | Storaasli et al. | |
| 7,514,628 B2 | 4/2009 | Kadrnoska et al. | |
| 7,522,805 B2 * | 4/2009 | Smith | G02B 6/4452 385/135 |
| 7,674,980 B2 | 3/2010 | Lubanski | |
| 7,740,417 B2 | 6/2010 | Jang | |
| 7,849,886 B2 | 12/2010 | Carew et al. | |
| D640,290 S | 6/2011 | Stellman et al. | |
| 8,061,344 B2 | 11/2011 | Dofher | |
| 8,480,332 B2 | 7/2013 | Miller | |
| 9,062,423 B2 | 6/2015 | Allouche et al. | |
| 9,226,418 B2 * | 12/2015 | Magno, Jr. | H05K 5/0221 |
| 9,270,098 B2 * | 2/2016 | Isaacks | H02G 3/086 |
| 9,531,174 B2 | 12/2016 | Elford et al. | |
| 2002/0061231 A1 | 5/2002 | Finzel et al. | |
| 2003/0123935 A1 | 7/2003 | Dofher | |
| 2003/0210958 A1 | 11/2003 | Nothofer | |
| 2004/0115004 A1 | 6/2004 | Serrano | |
| 2004/0129445 A1 | 7/2004 | Winkelbach | |
| 2004/0221324 A1 * | 11/2004 | Ansari | H04L 27/0008 725/140 |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0259930 A1 | 11/2005 | Elkins et al. | |
| 2005/0285807 A1 | 12/2005 | Zehngut | |
| 2006/0008231 A1 | 1/2006 | Reagan | |
| 2006/0093303 A1 | 5/2006 | Reagan et al. | |
| 2006/0118338 A1 | 6/2006 | Maybury | |
| 2006/0204187 A1 | 9/2006 | Dofher | |
| 2007/0018849 A1 | 1/2007 | Salser, Jr. | |
| 2007/0154152 A1 | 7/2007 | Morris | |
| 2008/0298755 A1 | 12/2008 | Caplan | |
| 2009/0214163 A1 | 8/2009 | Lu | |
| 2009/0317047 A1 | 12/2009 | Smith | |
| 2010/0010117 A1 | 1/2010 | Bricout | |
| 2010/0047021 A1 | 2/2010 | Scola | |
| 2010/0071596 A1 | 3/2010 | Konczak | |
| 2010/0086254 A1 | 4/2010 | Dofher | |
| 2010/0243096 A1 | 9/2010 | Berglund et al. | |
| 2011/0016754 A1 | 1/2011 | Ruhl et al. | |
| 2011/0052131 A1 | 3/2011 | Park et al. | |
| 2011/0315259 A1 | 12/2011 | Kelly | |
| 2012/0048148 A1 | 3/2012 | Konczak | |
| 2012/0195694 A1 | 8/2012 | Konczak | |
| 2013/0011198 A1 | 1/2013 | Pichler | |
| 2013/0044918 A1 | 2/2013 | Nielsen et al. | |
| 2013/0216187 A1 | 8/2013 | Dowling | |
| 2013/0216313 A1 | 8/2013 | Gustavsson et al. | |
| 2013/0223807 A1 | 8/2013 | Elford et al. | |
| 2013/0287500 A1 | 10/2013 | Miller | |
| 2013/0294839 A1 | 11/2013 | Gustavsson et al. | |
| 2014/0202571 A1 | 7/2014 | Spijker | |
| 2014/0270971 A1 | 9/2014 | Allouche et al. | |
| 2014/0327583 A1 | 11/2014 | Sparks | |
| 2015/0035704 A1 | 2/2015 | Schwengler et al. | |
| 2015/0070221 A1 | 3/2015 | Schwengler et al. | |
| 2015/0110453 A1 | 4/2015 | Elford et al. | |
| 2015/0139598 A1 * | 5/2015 | Barnes | G02B 6/4448 385/135 |
| 2015/0230008 A1 | 8/2015 | Elford et al. | |
| 2015/0288161 A1 | 10/2015 | Allouche et al. | |
| 2015/0300527 A1 | 10/2015 | Konczak | |
| 2016/0109036 A1 | 4/2016 | Elford et al. | |
| 2016/0109678 A1 | 4/2016 | Schwengler et al. | |
| 2016/0112779 A1 | 4/2016 | Barnett et al. | |
| 2017/0059802 A1 | 3/2017 | Elford et al. | |
| 2017/0110784 A1 | 4/2017 | Vermes et al. | |

FOREIGN PATENT DOCUMENTS

| | | |
|---|---|---|
| GB | 2327680 | 2/1999 |
| JP | H03 139705 | 6/1991 |
| JP | 10-140507 | 5/1998 |
| WO | WO 99/61710 | 12/1999 |
| WO | WO 02/29947 | 4/2002 |
| WO | WO 2013/130644 A1 | 9/2013 |
| WO | WO 2014/151726 A1 | 9/2014 |

OTHER PUBLICATIONS

International Search Report and Written Opinion prepared by the U.S. Patent and Trademark Office as International Searching Authority for PCT International Patent Application No. PCT/US2013/0280 mailed May 3, 2013; 20 pages.
PCT International Patent Application No. PCT/US2014/026325, International Preliminary Report on Patentability issued Sep. 15, 2015; 8 pages.
Preliminary Report on Patentability for PCT International Patent Application No. PCT/US2013/0280 mailed Sep. 12, 2014; 13 pages.
Publication Notice of PCT International Patent Application No. PCT/U/26325; mailed Sep. 25, 2014; 1 page.
U.S. Appl. No. 13/779,488; Final Rejection dated Sep. 24, 2015; 9 pages.
U.S. Appl. No. 13/779,488; Final Rejection dated Feb. 9, 2015; 9 pages.
U.S. Appl. No. 13/779,488; Non-final Rejection dated Feb. 17, 2016; 13 pages.
U.S. Appl. No. 13/779,488; Non-final Rejection dated Jun. 11, 2015; 11 pages.
U.S. Appl. No. 13/779,488; Non-final Rejection dated Sep. 10, 2014; 11 pages.
U.S. Appl. No. 13/779,488; Requirement for Restriction/Election dated May 30, 2014; 5 pages.
U.S. Appl. No. 14/209,754; Issue Notification dated Jun. 3, 2015; 1 page.
U.S. Appl. No. 14/209,754; Non-Final Rejection dated Jan. 13, 2015; 16 pages.
U.S. Appl. No. 14/209,754; Notice of Allowance dated Feb. 18, 2015; 11 pages.
U.S. Appl. No. 14/517,574; Non-Final Rejection dated Feb. 26, 2016; 28 pages.
U.S. Appl. No. 14/517,574; Requirement for Restriction dated Jan. 15, 2016; 6 pages.

(56) References Cited

OTHER PUBLICATIONS

U.S. Appl. No. 14/746,508; Non-Final Rejection dated Dec. 3, 2015; 16 pages.
U.S. Appl. No. 13/779,488; Final Rejection dated May 2, 2016; 7 pages.
U.S. Appl. No. 14/517,574; Final Rejection dated Jun. 16, 2016; 15 pages.
U.S. Appl. No. 14/578,851; Non-Final Rejection dated Jun. 8, 2016; 26 pages.
U.S. Appl. No. 14/973,458; Non-Final Rejection dated Jun. 7, 2016; 25 pages.
U.S. Appl. No. 14/316,665; Non-Final Rejection dated Aug. 10, 2016; 38 pages.
U.S. Appl. No. 14/316,676; Non-Final Rejection dated Aug. 10, 2016; 43 pages.
U.S. Appl. No. 13/779,488; Notice of Allowance dated Aug. 16, 2016; 16 pages.
European Patent Application No. 14768062.3; Extended European Search Report dated Oct. 18, 2016; 5 pages.
U.S. Appl. No. 14/517,574; Non-Final Rejection dated Oct. 21, 2016; 18 pages.
U.S. Appl. No. 13/779,488; Issue Notification dated Dec. 7, 2016; 1 page.
U.S. Appl. No. 14/316,665; Final Rejection dated Feb. 8, 2017; 17 pages.
U.S. Appl. No. 14/578,851; Non-Final Rejection dated Nov. 17, 2016; 17 pages.
U.S. Appl. No. 14/973,458; Non-Final Rejection dated Nov. 18, 2016; 21 pages.
U.S. Appl. No. 14/316,676; Non-Final Rejection dated Feb. 14, 2017; 17 pages.
U.S. Appl. No. 14/973,458; Non-Final Rejection dated May 3, 2017; 21 pages.
U.S. Appl. No. 14/578,851; Non-Final Rejection dated May 3, 2017; 19 pages.
U.S. Appl. No. 14/316,665; Notice of Allowance dated May 19, 17; 15 pages.
U.S. Appl. No. 14/316,676; Notice of Allowance dated May 19, 2017; 12 pages.
U.S. Appl. No. 14/973,470; Non-Final Rejection dated Jul. 3, 2017; 34 pages.
U.S. Appl. No. 15/352,869; Non-Final Rejection dated May 15, 2017; 20 pages.

\* cited by examiner

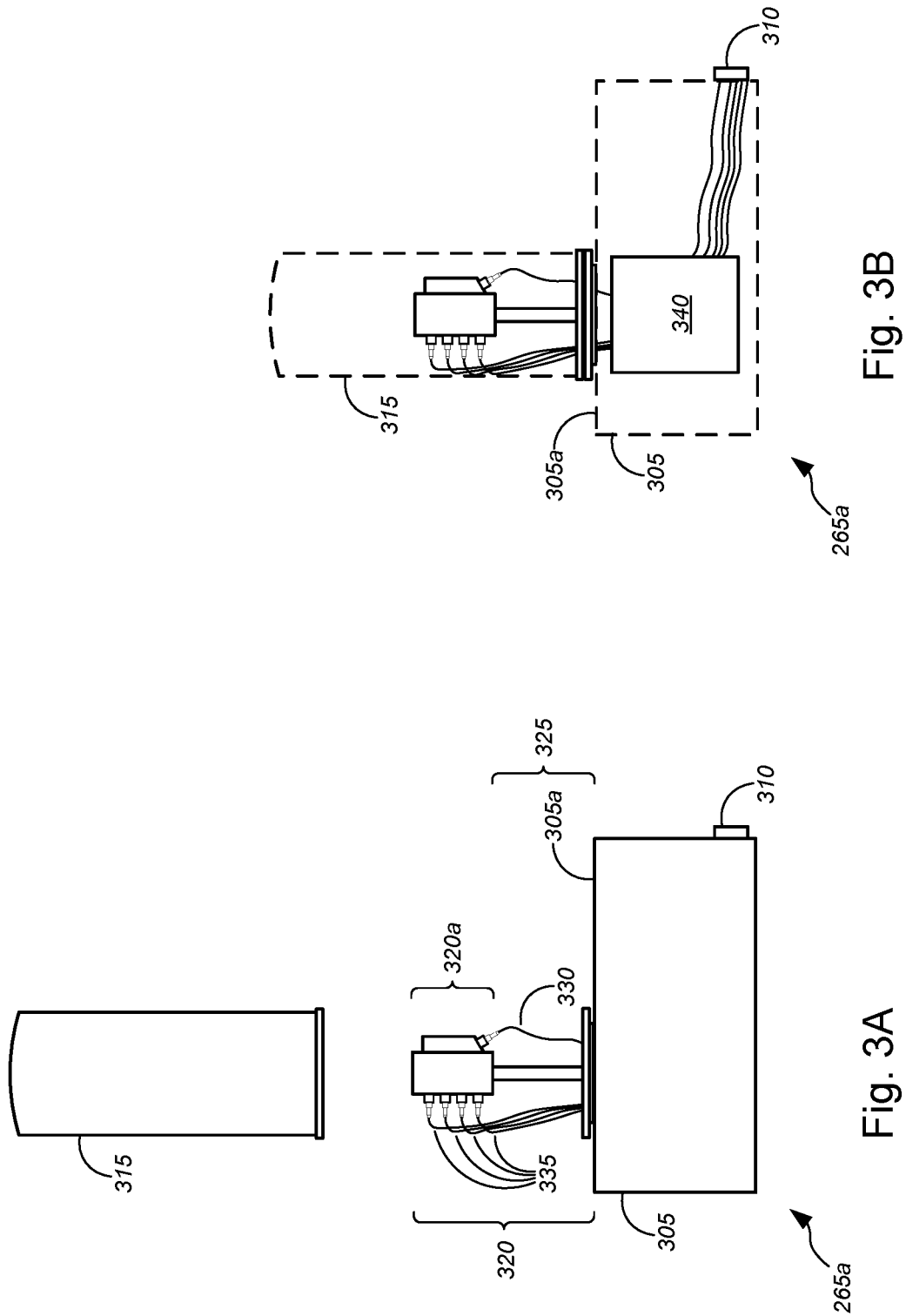

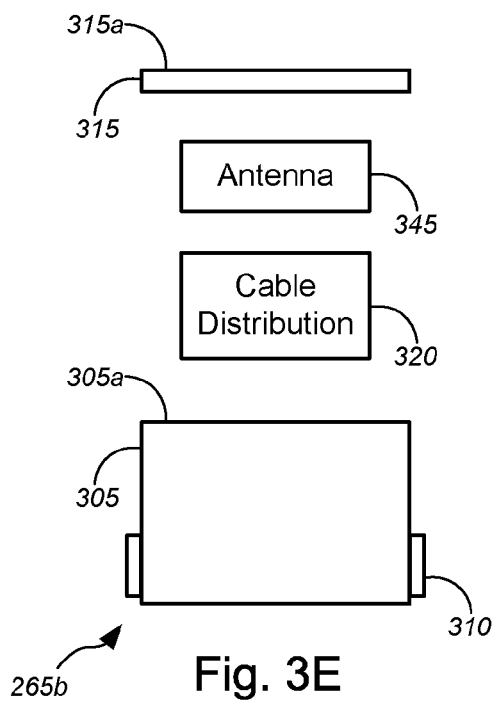
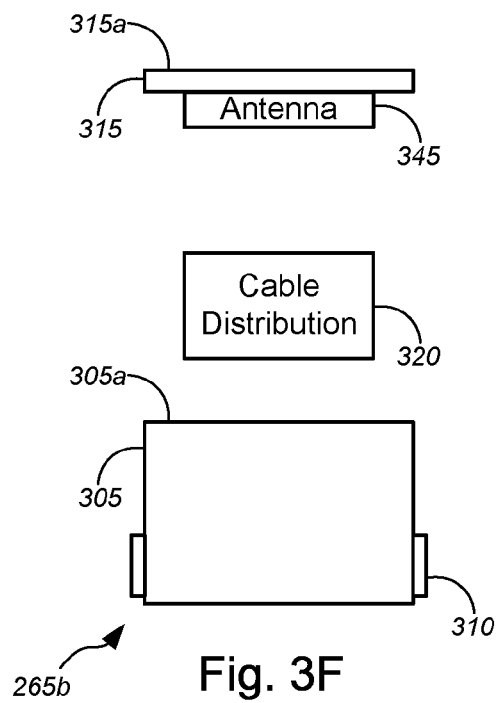
Fig. 3E
Fig. 3F
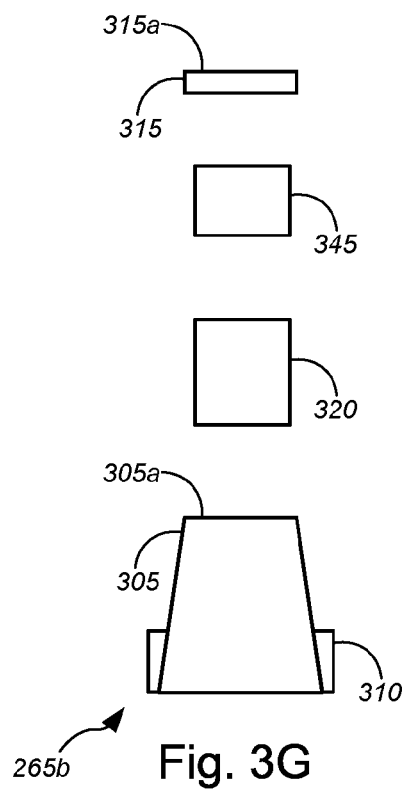
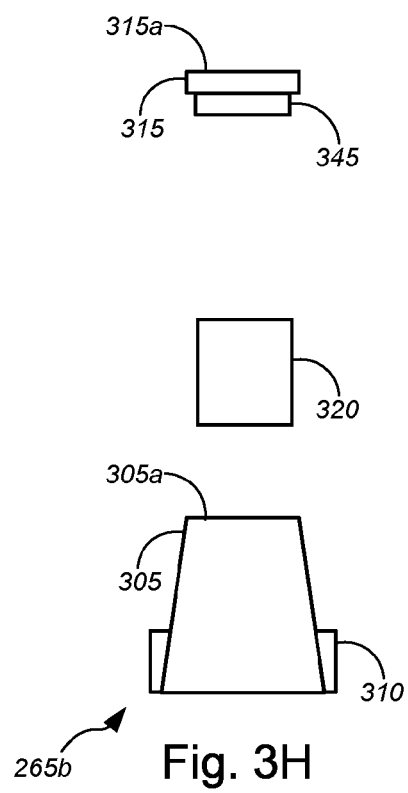
Fig. 3G
Fig. 3H

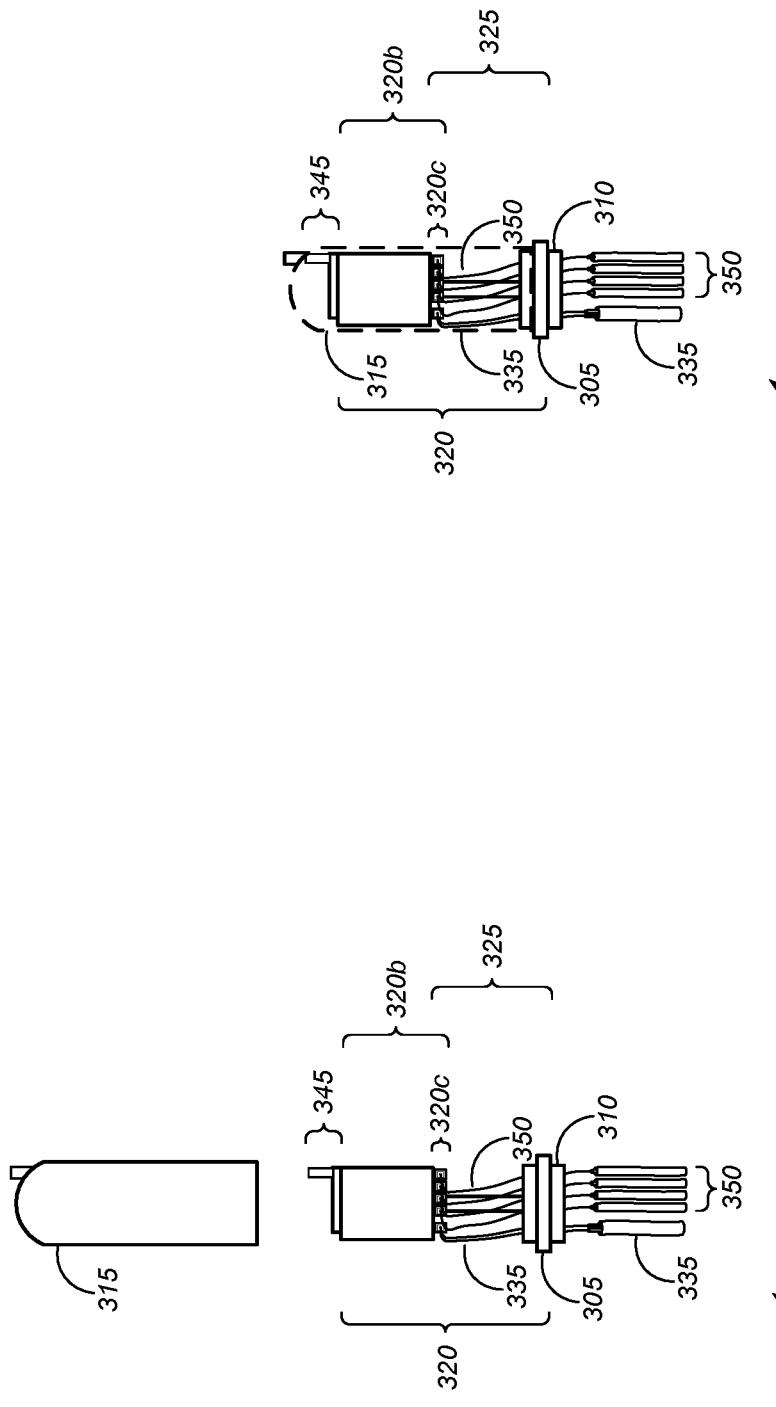

700

MEDIALINK INTERCONNECTION BOX

CROSS-REFERENCES TO RELATED APPLICATIONS

This application claims priority to U.S. Patent Application Ser. No. 62/109,757 (the "'757 Application"), filed Jan. 30, 2015 by Michael L. Elford et al. entitled, "MediaLink Interconnection Box (MIB)."

This application may also be related to U.S. Patent Application Ser. No. 61/939,109 (the "'109 Application"), filed Feb. 12, 2014 by Michael L. Elford et al. entitled, "Point-to-Point Fiber Insertion"; U.S. patent application Ser. No. 14/578,851 (the "'851 Application"), filed on Dec. 22, 2014 by Michael L. Elford et al. entitled, "Point-to-Point Fiber Insertion," which claims priority to the '109 Application; U.S. Patent Application Ser. No. 61/893,034 (the "'034 Application"), filed Oct. 18, 2013 by Michael L. Elford et al. entitled, "Fiber-to-the-Home (FTTH) Methods and Systems"; U.S. patent application Ser. No. 14/517,574 (the "'574 Application"), filed on Oct. 17, 2014 by Michael L. Elford et al. entitled, "Fiber-to-the-Premises (FTTP) Methods and Systems," which claims priority to the '034 Application; U.S. Patent Application Ser. No. 61/874,691 (the "'691 Application"), filed Sep. 6, 2013 by Thomas Schwengler et al. entitled, "Wireless Distribution Using Cabinets, Pedestals, and Hand Holes"; U.S. patent application Ser. No. 14/316,676 (the "'676 Application"), filed on Jun. 26, 2014 by Thomas Schwengler et al. entitled, "Wireless Distribution Using Cabinets, Pedestals, and Hand Holes," which claims priority to the '691 Application"; U.S. Patent Application Ser. No. 61/861,216 (the "'216 Application"), filed Aug. 1, 2013 by Thomas Schwengler et al. entitled, "Wireless Access Point in Pedestal or Hand Hole"; and U.S. patent application Ser. No. 14/316,665 (the "'665 Application"), filed on Jun. 26, 2014 by Thomas Schwengler et al. entitled, "Wireless Access Point in Pedestal or Hand Hole," which claims priority to the '216 Application. This application may also be related to U.S. Patent Application Ser. No. 61/793,514 (the "'514 Application"), filed Mar. 15, 2013 by Erez N. Allouche et al. entitled, "Cast-in-Place Fiber Technology"; U.S. patent application Ser. No. 14/209,754 (the "'754 Application"), filed Mar. 13, 2014 by Erez N. Allouche et al. entitled, "Cast-in-Place Fiber Technology," which claims priority to the '514 Application; U.S. Patent Application Ser. No. 61/604,020 (the "'020 Application"), filed Feb. 28, 2012 by Michael L. Elford et al. entitled, "Apical Conduit and Methods of Using Same," U.S. Patent Application Ser. No. 61/636,227 (the "'227 Application"), filed Apr. 20, 2012 by Michael L. Elford et al. entitled, "Apical Conduit and Methods of Using Same"; and U.S. patent application Ser. No. 13/779,488 (the "'488 Application"), filed Feb. 27, 2013 by Michael L. Elford et al. entitled, "Apical Conduit and Methods of Using Same," which claims priority to the '020 and '227 Applications.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Field

The present disclosure relates, in general, to methods, systems, and apparatuses for implementing telecommunications signal relays, and, more particularly, to methods, systems, and apparatuses for implementing a plurality of media interconnection devices for bulk service provider applications (such as media distribution applications for recreational vehicle ("RV") parks or the like).

Background

Currently, in bulk service provider applications, multiple individual outdoor demarcation boxes of varying sizes are deployed to enable direct customer interconnection to video, Internet, and/or plain old telephone service ("POTS") services provided by a service provider. Most often, it is one outdoor box for each customer and for each type of service offering. In some locations, a large backboard with support poles embedded in concrete is used to support the various boxes necessary to serve two adjacent customers. Since the customer termination enclosures are located outside and are subject to wind and weather, their size and/or number can cause problems for the bulk service provider. The pace and initial material expense required for this typical configuration make the initial cost of deployment prohibitive for many small bulk service customers, such as recreational vehicle ("RV") park customers or the like.

Hence, there is a need for more robust and scalable solutions for implementing Fiber-to-Drop-Point ("FTDP") and/or point-to-point fiber insertion within a passive optical network ("PON") communications system, such as within FTTx systems (including FTTH, FTTB, FTTP, FTDP, FTTN, FTTC, and/or the like), in particular, within apical conduit-based FTTx systems, for bulk service provider applications (such as media distribution applications for RV parks or the like).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3J are general schematic diagrams illustrating various ground-based signal distribution devices that may be used in implementing FTDP and/or point-to-point fiber insertion within a PON communications system, in accordance with various embodiments.

DETAILED DESCRIPTION OF CERTAIN EMBODIMENTS

Overview

Figure 1A:
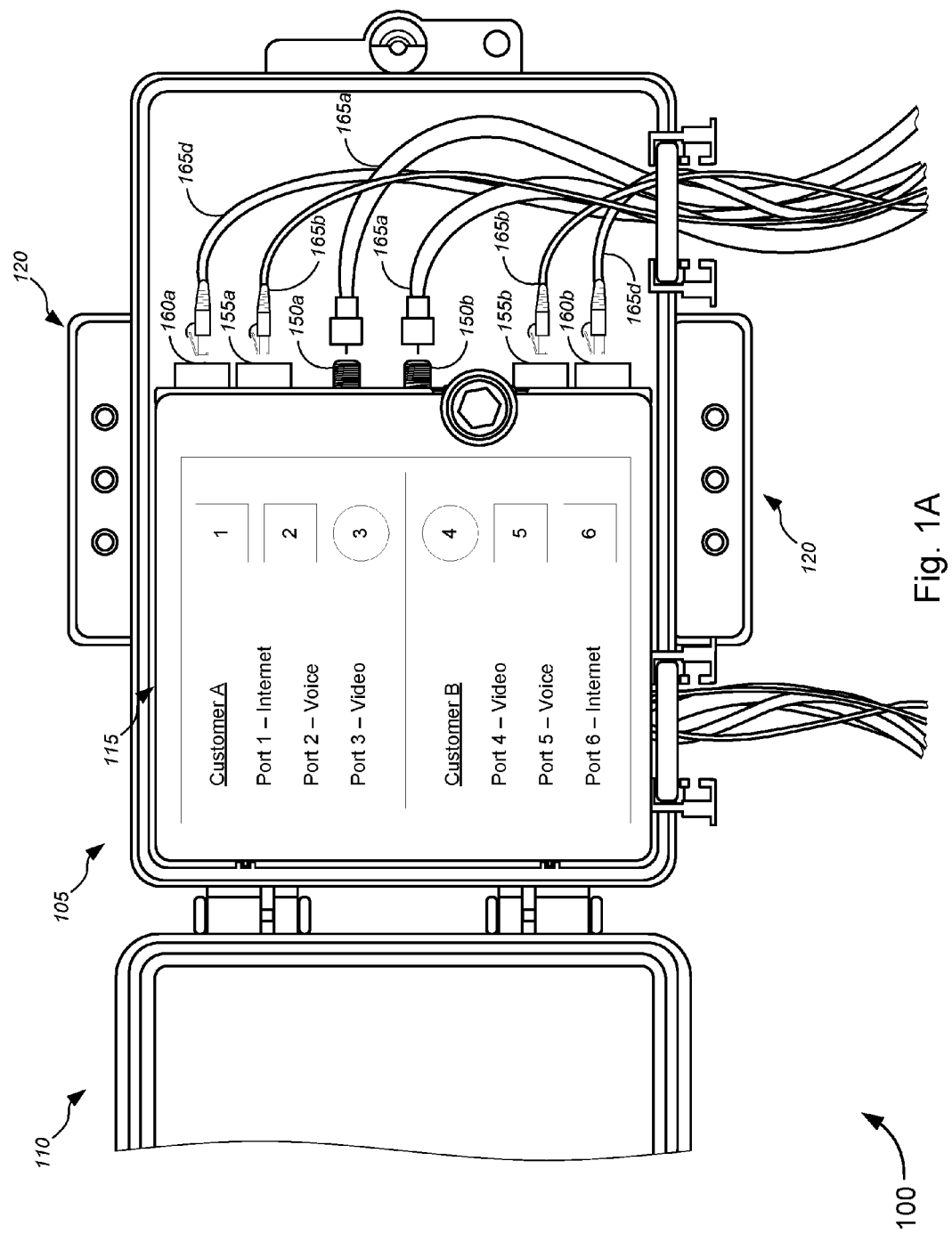
FIGS. 1A and 1B are general schematic diagrams illustrating various views of an embodiment of a media interconnection device, in accordance with various embodiments.

Various embodiments provide tools and techniques for implementing a plurality of media interconnection devices for bulk service provider applications (such as media distribution applications for recreational vehicle ("RV") parks or the like), in some cases, via implementation of Fiber-to-Drop-Point ("FTDP") and/or point-to-point fiber insertion within a passive optical network ("PON") communications system (using apical conduit systems as described in the Related Applications), in other cases, via implementation of traditional ground-based or buried line interconnections, while in yet other cases, via implementation of a combination of apical conduit systems and traditional ground-based or buried line interconnections.

In various embodiments, a MediaLink Interconnection Box ("MIB") or a media interconnection device might be provided. The MIB or media interconnection device is demarcation unit designed to provide an accessible indoor or outdoor interface where current or temporary/transient customers can directly connect to land line service (e.g., POTS service), video or television service, and/or Ethernet or Internet services provided by one or more service providers. The MIB or media interconnection device is ideal for locations with bulk service agreements, such as RV parks, which offer all or some of these possible service connections on a long-term or short-term basis. The MIB or media interconnection device is designed to serve a minimum of one or two distinct customers from one outdoor rated housing while creating a secure point of presence for the one or more service providers. A single point of interconnection (such as via the use of the MIB or media interconnection device) simplifies end customer connections and saves space for the bulk service provider.

Further advantages of a system incorporating a plurality of MIBs or media interconnection devices (particularly when implemented in conjunction with an apical conduit system as described herein and in the Related Applications) include, without limitation, a low price point for implementation, a consolidated, compact, single multi-port customer terminating device that serves multiple customers, space and materials savings in the field, reduction in initial installation costs and maintenance truck rolls to support multiple devices. In alternative embodiments, traditional or conventional ground-based (i.e., non-apical conduit-type) or buried line implementations (that used direct buried cables, direct buried cable bundles, direct buried conduits for cables, and/or the like) may be used to feed source cables (i.e., video cables, telephone cables, Internet cables, and/or the like) to the plurality of MIBs or media interconnection devices. In yet other alternative embodiments, a combination of apical conduit system and traditional or conventional ground-based (i.e., non-apical conduit-type) or buried line implementations may be used to feed source cables (i.e., video cables, telephone cables, Internet cables, and/or the like) to the plurality of MIBs or media interconnection devices.

In some embodiments, the PON communications system might include implementation of FTTx, which might include Fiber-to-the-Home ("FTTH"), Fiber-to-the-Building ("FTTB"), Fiber-to-the-Premises ("FTTP"), Fiber-to-Drop-Point ("FTDP"), Fiber-to-the-Node ("FTTN"), Fiber-to-the-Curb ("FTTC"), and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a media interconnection device might be provided. The media interconnection device might comprise a waterproof and weather-resistant container comprising an external housing and an external lid. The media interconnection device might also comprise an inner compartment disposed within the external housing, the inner compartment comprising an inner lid. The media interconnection device might further comprise a first set of media connectors disposed within the external housing, a second set of media connectors disposed within the external housing, and a set of input cables disposed within the inner compartment and communicatively coupled to each of the first set of media connectors and the second set of media connectors. The first set of media connectors might comprise a first set of output ports, while the second set of media connectors might comprise a second set of output ports. The first set of media connectors and the second set of media connectors are demarcation points between one or more service provider networks and at least two separate customer networks communicatively coupled to the first set of output ports and the second set of output ports, respectively. In other words, the first set of media connections is a demarcation point between the one or more service provider networks and one of the at least two separate customer networks communicatively coupled to the first set of output ports, while the second set of media connections is a demarcation point between the one or more service provider networks and another one of the at least two separate customer networks communicatively coupled to the second set of output ports.

In some embodiments, the set of input cables might comprise one or more video cables, one or more telephone cables, and one or more Internet cables. The first set of output ports might comprise a video output port communicatively coupled via the first set of media connectors to a first video cable of the one or more video cables, a telephone output port communicatively coupled via the first set of media connectors to a first telephone cable of the one or more telephone cables, and an Internet output port communicatively coupled via the first set of media connectors to a first Internet cable of the one or more Internet cables. Similarly, the second set of output ports might comprise a video output port communicatively coupled via the second set of media connectors to a second video cable of the one or more video cables, a telephone output port communicatively coupled via the second set of media connectors to a second telephone cable of the one or more telephone cables, and an Internet output port communicatively coupled via the second set of media connectors to a second Internet cable of the one or more Internet cables.

In some cases, the one or more Internet cables might be communicatively coupled to an optical network terminal ("ONT"), which might be communicatively coupled via at least one optical fiber line that is associated with one of a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service. According to some embodiments, the at least one optical fiber line might communicatively couple via a signal distribution device with one or more lines of an apical conduit system that are disposed in one or more channels in a ground surface. In some instances, the ONT might be located within the external housing. Alternatively, the ONT might be located within a second external housing between the media interconnection device and a signal distribution device servicing the ONT, and the second external housing might be one of disposed above ground or disposed underground.

According to some embodiments, each of the first and second video cables might be communicatively coupled with a video signal decoder. The video signal decoder might decode a scrambled video signal from a video service provider and might send a decoded video signal through one of the first video cable or the second video cable when a user associated with a corresponding one of the at least two separate customer networks in communication with the one of the first video cable or the second video cable subscribes to video service. In some cases, the video signal decoder might be located within the external housing. Alternatively, the video signal decoder might be located within a separate housing located within a video signal distribution hub that is located at a local site (e.g., a bulk service application site, such as a recreational vehicle ("RV") park).

In some embodiments, each of the first and second telephone cables might be communicatively coupled with a private branch exchange ("PBX") that tracks local and long-distance (and perhaps also international) usage over at least one of the first and second telephone cables by a corresponding user associated with at least one of the at least two separate customer networks corresponding to the at least one of the first and second telephone cables. In some instances, the PBX might be located at a local site (e.g., a bulk service application site, such as a RV park).

Merely by way of example, in some cases, the set of input cables might comprise at least two of one or more video cables, one or more telephone cables, or one or more Internet cables. Alternatively, the set of input cables might comprise one or more Internet cables that provides Internet service and at least one of Internet-based video service or Voice over Internet Protocol ("VoIP") service to one or more of the at least two separate customer networks.

According to some embodiments, the external housing might be mounted on a post that is set in the ground between two adjacent parking slots of a RV park. In some instances, a first customer network of the at least two separate customer networks might comprise a first local area network ("LAN") located within a first RV that is parked in one of the two adjacent parking slots, while a second customer network of the at least two separate customer networks might comprise a second LAN located within a second RV that is parked in the other one of the two adjacent parking slots.

In another aspect, a communication system might be provided. The communication system might comprise an apical conduit system, a signal distribution device, and a plurality of media interconnection devices located at a first site. The apical conduit system might comprise one or more first sets of lines disposed in one or more first channels in a first ground surface, one or more second sets of lines disposed in one or more second channels in a second ground surface, and a filler material disposed around at least one of the one or more first sets of lines in at least a portion of the one or more first channels or around at least one of the one or more second sets of lines in at least a portion of the one or more second channels. The one or more first sets of lines might be associated with at least one of one or more service providers or one or more services. At least two sets of lines of the one or more second sets of lines serving each media interconnection device of the plurality of media interconnection devices located at the first site.

The signal distribution device might comprise a container disposed in a third ground surface, a top portion of the container being one of substantially level with a top portion of the third ground surface or below the top portion of the third ground surface. The signal distribution device might further comprise a cable distribution device disposed within the signal distribution device and configured to communicatively couple each of at least one first set of lines of the one or more first sets of lines with each of the one or more second sets of lines.

Each of the plurality of media interconnection devices might comprise a waterproof and weather-resistant container comprising an external housing and an external lid. Each media interconnection device might also comprise an inner compartment disposed within the external housing, the inner compartment comprising an inner lid. Each media interconnection device might further comprise a first set of media connectors disposed within the external housing, a second set of media connectors disposed within the external housing, and a set of input cables disposed within the inner compartment and communicatively coupled to each of the first set of media connectors and the second set of media connectors. The first set of media connectors might comprise a first set of output ports, while the second set of media connectors might comprise a second set of output ports. The first set of media connectors and the second set of media connectors are demarcation points between one or more service provider networks and at least two separate customer networks communicatively coupled to the first set of output ports and the second set of output ports, respectively. In other words, the first set of media connections is a demarcation point between the one or more service provider networks and one of the at least two separate customer networks communicatively coupled to the first set of output ports, while the second set of media connections is a demarcation point between the one or more service provider networks and another one of the at least two separate customer networks communicatively coupled to the second set of output ports. The set of input cables might communicatively couple with the at least two sets of lines of the one or more second sets of lines.

According to some embodiments, the set of input cables might comprise one or more video cables, one or more telephone cables, and one or more Internet cables. The first set of output ports might comprise a video output port communicatively coupled via the first set of media connectors to a first video cable of the one or more video cables, a telephone output port communicatively coupled via the first set of media connectors to a first telephone cable of the one or more telephone cables, and an Internet output port communicatively coupled via the first set of media connectors to a first Internet cable of the one or more Internet cables. The second set of output ports might comprise a video output port communicatively coupled via the second set of media connectors to a second video cable of the one or more video cables, a telephone output port communicatively coupled via the second set of media connectors to a second telephone cable of the one or more telephone cables, and an Internet output port communicatively coupled via the second set of media connectors to a second Internet cable of the one or more Internet cables.

In some embodiments, the signal distribution device might comprise a fiber distribution hub ("FDH"), and the one or more first sets of lines might communicatively couple at least one of a central office or a digital subscriber line access multiplexer ("DSLAM") of a telecommunications service provider with the FDH. The one or more second sets of lines might communicatively couple the FDH with a network access point ("NAP"). The fiber distribution hub, in some instances, might comprise a pedestal disposed above the top portion of the container, and at least one of the first cable distribution device or the second cable distribution device might be disposed within one of the container or the pedestal.

In alternative embodiments, the signal distribution device might comprise a NAP, and the one or more first sets of lines might communicatively couple the NAP with a FDH. The one or more second sets of lines might communicatively couple the NAP with one or more media interconnection devices of the plurality of media interconnection devices. In some cases, the NAP might comprise a direct bury NAP disposed below the top portion of the third ground surface. In some instances, the NAP might comprise a NAP disposed within one of a hand hole or a flowerpot hand hole that is at least partially disposed below the third ground surface. In some embodiments, the one or more media interconnection devices might comprise at least one optical network terminal ("ONT"). According to some embodiments, each of the one or more first sets of lines might be associated with one of a passive optical network ("PON") service, a gigabit PON ("GPON") service, an Ethernet fiber line service, an Ethernet PON ("EPON") service, a next generation PON ("NG-PON") service, or a second generation NGPON or 40 Gigabit-capable PON ("NGPON2") service.

Merely by way of example, in some instances, at least a portion of the first ground surface might be a roadway surface, at least a portion of the second ground surface might be one of a roadway surface or a non-roadway surface, and at least a portion of the third ground surface might be a non-roadway surface. In some embodiments, at least one channel of the one or more first channels and at least one channel of the one or more second channels might be the same channel. According to some embodiments, each media interconnection device might be mounted on a post that is set in the ground between two adjacent parking slots of a recreational vehicle ("RV") park.

In yet another aspect, a method might comprise connecting one of (or at least one of) a video cable, a telephone cable, or an Internet cable into a corresponding port in one of a first set of output ports or a second set of output ports in a media interconnection device. The media interconnection device might comprise a waterproof and weather-resistant container comprising an external housing and an external lid. The media interconnection device might also comprise an inner compartment disposed within the external housing, the inner compartment comprising an inner lid. The media interconnection device might further comprise a first set of media connectors disposed within the external housing, a second set of media connectors disposed within the external housing, and a set of input cables disposed within the inner compartment and communicatively coupled to each of the first set of media connectors and the second set of media connectors. The first set of media connectors might comprise a first set of output ports, while the second set of media connectors might comprise a second set of output ports. The first set of media connectors and the second set of media connectors are demarcation points between one or more service provider networks and at least two separate customer networks communicatively coupled to the first set of output ports and the second set of output ports, respectively. In other words, the first set of media connections is a demarcation point between the one or more service provider networks and one of the at least two separate customer networks communicatively coupled to the first set of output ports, while the second set of media connections is a demarcation point between the one or more service provider networks and another one of the at least two separate customer networks communicatively coupled to the second set of output ports. The method might further comprise connecting the one of (or the at least one of) the video cable, the telephone cable, or the Internet cable into a corresponding port in a panel in a recreational vehicle ("RV").

In some embodiments, the set of input cables might comprise one or more video cables, one or more telephone cables, and one or more Internet cables. The first set of output ports might comprise a video output port communicatively coupled via the first set of media connectors to a first video cable of the one or more video cables, a telephone output port communicatively coupled via the first set of media connectors to a first telephone cable of the one or more telephone cables, and an Internet output port communicatively coupled via the first set of media connectors to a first Internet cable of the one or more Internet cables. The second set of output ports might comprise a video output port communicatively coupled via the second set of media connectors to a second video cable of the one or more video cables, a telephone output port communicatively coupled via the second set of media connectors to a second telephone cable of the one or more telephone cables, and an Internet output port communicatively coupled via the second set of media connectors to a second Internet cable of the one or more Internet cables.

According to some embodiments, the one or more Internet cables might be communicatively coupled to an optical network terminal ("ONT"), which is communicatively coupled via at least one optical fiber line that is associated with one of a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service.

Various modifications and additions can be made to the embodiments discussed without departing from the scope of the invention. For example, while the embodiments described above refer to particular features, the scope of this invention also includes embodiments having different combination of features and embodiments that do not include all of the above described features.

In some embodiments, a method might include routing an F1 line(s) from one of a central office ("CO"), a digital subscriber line access multiplexer ("DSLAM"), and/or near/within a block or neighborhood of customer premises (collectively, "source"), to a fiber distribution hub ("FDH") located within the block or local site of bulk service provider applications (e.g., RV park or the like), via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which might include channels in at least portions of roadways. Each of the F1, F2, and F3 lines might provide single direction communication or bi-directional communication.

In some embodiments, the F1, F2, and F3 lines might each include at least one optical fiber line. In some cases, the F1, F2, and F3 lines might each further include, without limitation, one or more of at least one conductive signal line, at least one power line, and/or the like. The at least one conductive signal line might include, but are not limited to, copper data lines, copper video lines, copper voice lines, or any suitable (non-optical fiber) data cables, (non-optical fiber) video cables, or (non-optical fiber) voice cables, and/or the like.

With respect to the optical fiber lines in each of the F1, F2, and F3 lines in various embodiments, F3 lines (being distributed from a NAP to a NID or ONT), might include two single fiber lines (for duplex communication) that may be bundled as a single cable, which for simplicity below might be referred to as a "single bundled fiber line," "single bundled (duplex) fiber line," or "single bundled duplex fiber line." In some instances, such single bundled fiber line might be used for Ethernet fiber communications, or the like. In some embodiments, a single fiber line might be configured for duplex communication by sending communications in one direction (e.g., downstream (i.e., for "downloading") from CO (and a network such as, but not limited to, the Internet or the like) to customer premises) using one wavelength (or range of wavelengths), while sending communications in the opposite direction (e.g., upstream (i.e., for "uploading") from the customer premises to the CO (and to the Internet or some other network)) using a different wavelength (or range of wavelengths). For simplicity below, such single fiber line might be referred to as a "single fiber line," "single (duplex) fiber line," or "single duplex fiber line."

In some embodiments, an F2 line for PON communications (being distributed from a FDH to a NAP) might include 12 single (duplex) fiber lines. In some instances, the NAP might be an 8 port NAP. Here, "8 port" in 8 port NAP might refer to 8 output ports (each of which is communicatively coupled to a NID/ONT of a customer premises via a F3 line). Unless otherwise indicated (such as with respect to FIG. 1B), single duplex fiber lines and corresponding ports are referred to herein, with appropriate equipment for sending communications in one direction using one wavelength (or one range of wavelengths) and sending communications in the opposite direction using a different wavelength (or different range of wavelengths). For an 8 port NAP to which the F2 line might be communicatively coupled, 8 single (duplex) fiber lines might be connected to 8 output ports, while 4 single (duplex) fiber lines might be unconnected or connected to dummy ports (i.e., ports that do not connect to any other component). The four unconnected lines might be referred to as "spare lines" or "spare fiber lines."

According to some aspects, an F1 line (being distributed from a CO to a FDH) might include a cable bundle having fiber lines. In some cases, the cable bundle might include 16 to 24 cables, each having a fiber line (in some cases, a single (duplex) fiber line; while, in other cases, a single bundled (duplex) fiber line (e.g., for Ethernet fiber service or the like)). In other cases, any suitable number of cables may be used, with any suitable number of fiber lines (i.e., not limited to 16 to 24 cables), as appropriate or as desired.

These and other aspects of the apical conduit system or the point-to-point fiber insertion, or the like, are described in detail in the Related Applications, particularly, the '851, '574, '676, '665, '754, and '488 Applications, which have already been incorporated herein by reference in their entirety.

Herein and in the Related Applications, "red box device" might refer to a cable distribution device that takes an F2 line and isolates, separates, or "de-bundles" the 12 fiber lines therein (i.e., input lines) for individual connection with 12 ports/fiber lines (i.e., output lines/ports), and subsequently combined into another F2 line. In the red box device, any one or more of the 12 input lines may be connected to dummy ports (also referred to as ports within a "parking lot") within the red box device, and additional fiber lines (e.g., for other services and/or from other service providers) might be received by the red box device and connected with the output line to which the one or more of the 12 input lines would have been connected. In other words, the red box device allows for individual fiber line connection with an additional fiber line for point-to-point fiber insertion implementation for fiber cable bundles (such as F2 lines). In some embodiments, the red box device may be located within a FDH, while, in other embodiments, the red box device might be located anywhere in the apical conduit system or in the PON communications system along which the F2 line(s) are placed. By implementing red box devices for point-to-point insertion of a different fiber service (including, but not limited to, an Ethernet fiber line service, a next generation PON ("NGPON") service, and/or a second NGPON ("NGPON2") service, or the like; in some cases, by a different service provider than the one that established or is maintaining/operating the PON communications system) and/or other techniques described herein, "touchless" apical or FTTx may be achieved. That is, excavation to replace or add the addition fiber lines for the additional services (which may be from the same service provider or a different one) may be obviated, thereby eliminating the need for surveying, laying of new optical lines and connections, inspections, and/or the like, and thus reducing cost and time in the long run, although initial investment in the infrastructure is necessary to lay all the lines for the PON communications system and/or the apical conduit system.

Herein and in the Related Applications, "connector" might refer to any suitable connector. For fiber lines, suitable connectors might include, without limitation, SC connectors (also referred to as "subscriber connectors," "square connectors," or "standard connectors"), LC connectors (also referred to as "Lucent connectors," "little connector," or "local connector"), ST connectors (also referred to as "Straight Tip connectors"), FC connectors (also referred to as "Ferrule connectors"), MT connectors (also referred to as "Mechanical Transfer connectors"), MT-RJ connectors (also referred to as "Mechanical Transfer Registered Jack connectors"), MPO/MTP connectors (in which MPO connectors are also referred to as "multiple-fiber push-on/pull-off connectors"; and MTP is a connector that interconnects with MPO connectors), or the like. A LC connector, a ST connector, and a FC connector might each allow for connection of one single (duplex) fiber line with another, and thus might be used for connecting F1 or F3 lines, either to each other or to a corresponding port. A MPO/MTP connector might allow for connection of a set of 12 single (duplex or simplex) fiber line with another set of 12 single (duplex or simplex) fiber line with another, and thus are used for connecting F2 lines, either to each other or to a corresponding port. MT connectors allow for connection of one set of multiple fiber lines with another set of multiple fiber lines, while MT-RJ connectors allow for connection of 2 fiber lines with another 2 fiber lines. In some cases, an MPO/MTP connector might allow for connection of a set of 4 to 24 fibers with another set of 4 to 24 fibers. A SC connector (which might include an angled physical contact SC ("SC/APC") connector, an ultra polished contact SC ("SC/UPC") connector, or the like), like the LC connector, the ST connector, or the FC connector, might allow for connection of a single (duplex) fiber line with another, and are used for connecting F1 lines to (optical) splitter devices that "split" or divide signals in a single fiber (typically, evenly) into signals in multiple fibers (as described in detail below).

These different connector standard types of boots (e.g., ST, FC, SC, LC, etc.) are different designs aimed at minimizing face rotation of the fiber edge, and containing spring loads for the ferrules to maintain contact with light pressure. An alignment sleeve insures good alignment and angle matching. Actual fiber core connection types also vary, independent of boot style; the different connection types, PC, UPC, or APC, have different designs and characteristics of the fiber end-faces. PC or "physical contact" connectors are connectors using a spring loaded ferrule to maintain good physical contact between fiber end surfaces, and minimize reflection and loss caused by irregularities and dielectric discontinuities between the fiber faces. UPC or "ultra polished" contacts are machine-polished rounded finish, and are designed to provide good core contact and to further improve insertion loss and return loss characteristics. APC or "angled physical contact" connectors have a connecting surface angled (at approximately 8 degrees) which causes reflected modes to decay; they provide the best return loss characteristics.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail in the '574 Application. Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11af standard). In addition, small cells at 600 MHz and 700 MHz may be well-suited for use with these devices. In some embodiments, higher frequencies can be used such as 60 GHz and the corresponding standard IEEE 802.11ad. The '574, '216, and '665 Applications, which have been incorporated herein by reference in their entirety, describe in further detail embodiments utilizing wireless access points based on IEEE 802.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '034, '574, '691, '676, '216, and '665 Applications, which are already incorporated herein by reference in their entirety.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices (and in some cases, service loops), placing the spliced damaged line(s) and/or microduct(s) in the channel (in some instances, within a splice box that has been placed in the channel, e.g., during the repair process), placing the filler material in the channel, and placing the capping material in the channel over the filler material. Such repair techniques are described in detail in the '574 Application.

Some advantages of the systems described herein include, without limitation, relatively low cost, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein and in the Related Applications, surface trenching refers to a technique that is not unlike conventional micro-trenching techniques, except that trenching is within the top layer (e.g., asphalt layer or concrete layer, etc.) and not below the top layer. In conventional micro-trenching techniques, trenches might extend 12 to 18 inches below the surface of the top layer, and in some cases deeper (reaching below the top layer into or beyond a sub-base layer). In contrast, for surface trenching, trenches might extend a few inches (e.g., 2 to 6 inches), while remaining within the top layer (and not deeper than the top layer). Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTDP using apical conduit system techniques and in terms of line repair (as described above). Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

Telecommunications companies have precious assets in the ground, and deploy more. The various embodiments herein utilize these assets (and, in some cases, minimal radio infrastructure costs to overlay a fiber or copper plant or network with wireless broadband) to overlay one or more networks distributed within one or more apical conduit systems. In so doing, a cost effective fiber and cable network, with a network for backhaul, may be provided.

In some embodiments, the various embodiments described herein may be applicable to brownfield copper plants, to greenfield fiber roll-outs, and/or the like. Herein, "brownfield" might refer to land on which industrial or commercial facilities are converted (and in some cases decontaminated or otherwise remediated) into residential buildings (or other commercial facilities; e.g., commercial offices, etc.), while "greenfield" might refer to undeveloped land in a city or rural area that is used for agriculture, used for landscape design, or left to naturally evolve. In the telecommunications context, "brownfield" might also refer to land on which a telecommunications company might have some existing facilities and/or inventory (e.g., copper, etc.) and may not require converting the land and/or repurposing commercial facilities, while "greenfield" might also refer to land (which may have existing buildings) on which the telecommunications company might not already have some existing facilities, inventory, and/or services and might require converting the land and/or repurposing commercial or other facilities.

Specific Exemplary Embodiments

We now turn to the embodiments as illustrated by the drawings. FIGS. 1-7 illustrate some of the features of the method, system, and apparatus for implementing a plurality of media interconnection devices for bulk service provider applications (such as media distribution applications for recreational vehicle ("RV") parks or the like), in some cases, via implementation of Fiber-to-Drop-Point ("FTDP") and/or point-to-point fiber insertion within a passive optical network ("PON") communications system (using apical conduit systems as described in the Related Applications) and/or via implementation of traditional ground-based or buried line interconnections, while in yet other cases, via implementation of a combination of apical conduit systems and traditional ground-based or buried line interconnections, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '034, '574, '691, '676, '216, and '665 Applications, which are already incorporated herein by reference in their entirety—may be implemented in any of the ground-based signal distribution devices (including, without limitation, the FDH, the NAPs, the handholes, the NIDs, the ONTs, and/or the like) and/or in any of the media interconnection devices (also referred to herein as "MediaLink Interconnection Boxes"). In some embodiments, wireless access points may be disposed within compact devices that are disposed within apical conduit channels, at the top of apical conduit channels, or near the top of apical conduit channels, as described in detail in the '574 Application. In some cases, some or all of these wireless access points may be powered by power lines that are disposed along with the signal lines or fiber lines within the apical conduit system, and such powering of wireless access points is described in detail in the '691 and '676 Applications, already incorporated herein by reference in their entirety. The wireless access points may be part of small cells, micro cells, femto cells, pico cells, and/or the like, as appropriate or desired.

Figure 1B:
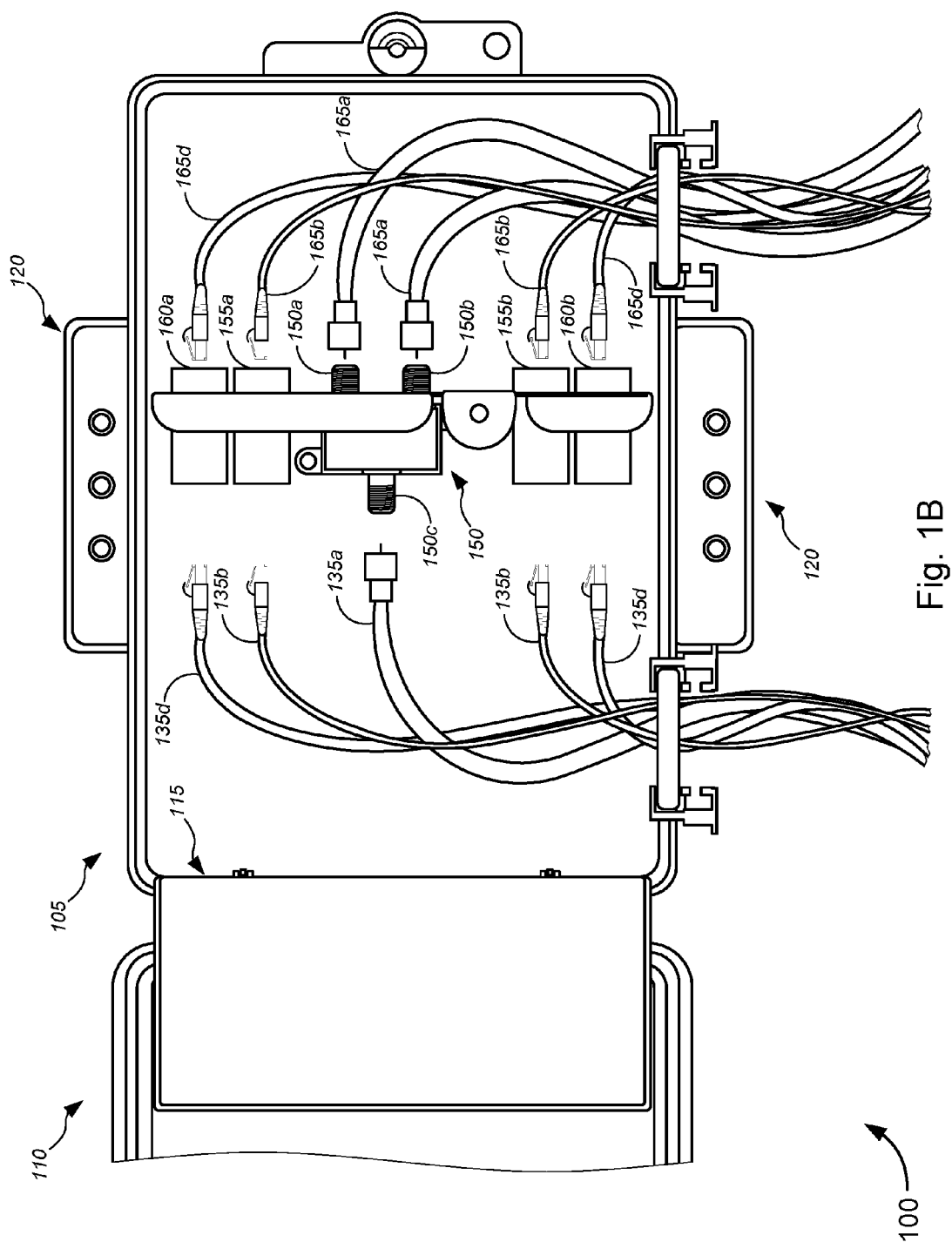

With reference to the figures, FIGS. 1A and 1B (collectively, "FIG. 1") are general schematic diagrams illustrating various views of an embodiment of a media interconnection device 100, in accordance with various embodiments. The MIB or media interconnection device 100 of FIG. 1 might generally correspond to the MIB or media interconnection devices 285 and 620 as described below with respect to FIGS. 2 and 4-6. The MIB or media interconnection devices 285 and 620, however, are not limited to the specific embodiment of MIB or media interconnection device 100, or vice versa, and any suitable embodiment or implementation may be implemented as appropriate without deviating from the scope of the various embodiments. For example, although FIGS. 2A and 4-6 depict the MIB or media interconnection device being implemented in conjunction with apical conduit systems (as described herein and in the Related Applications), the various embodiments are not so limited, and the MIB or media interconnection device (such as MIB or media interconnection device 100 shown in FIG. 1) may be implemented with one or more lines (including, but not limited to, one or more telephone cables, one or more video cables, one or more non-fiber Internet cables, one or more conductive signal lines, one or more power lines, one or more optical fiber lines, and/or the like) being disposed in the ground (in a manner such as with respect to traditional ground-based or buried line interconnections, or the like), as shown, e.g., in the embodiment of FIG. 2B. In some cases, a combination of apical conduit system interconnection and buried line interconnection may be utilized to connect, via corresponding lines, the various ports (i.e., video, telephone, and/or Internet input ports) with corresponding services (i.e., video service, telephone service, and/or Internet service offered by at least one service provider). FIG. 1A depicts the interior of MIB 100 with an inner lid 115 closed to protect the inner compartment, while FIG. 1B depicts the interior of MIB 100 with the inner lid 115 opened to expose portions of the inner compartment.

In the non-limiting embodiment of FIG. 1, MIB or media interconnection device 100 might comprise a waterproof and weather-resistant container comprising an external housing 105 and an external lid 110. In some embodiments, rubber gaskets or seals may be used in the perimeters of the external housing 105 and the external lid 110 to ensure that when the external lid 110 closes against the external housing 105, a waterproof and weather-resistant (e.g., dust-resistant, dirt-resistant, etc.) seal is formed by the rubber gaskets or seals. The MIB or media interconnection device 100 might further comprise an inner compartment disposed within the external housing, the inner compartment comprising an inner lid 115 that provides access to a technician employed by or contracted by the service provider associated with the MIB or media interconnection device 100. The MIB or media interconnection device 100 further comprises mounting brackets 120 for mounting the MIB or media interconnection device 100 to a post (e.g., post 420 of FIGS. 4 and 5, as described in detail above).

The MIB or media interconnection device 100 might further comprise one or more sets of interconnectors (typical two sets of interconnectors as shown in FIG. 1, although not limited to such; i.e., sometimes one set of interconnectors or four sets of interconnectors, or the like), each set of interconnectors including a video interconnector with video output port 150, a telephone interconnector with telephone output port 155, and an Internet interconnector with Internet port 160. In the embodiment of FIG. 1, two set of interconnectors are provided in MIB 100, with a first video interconnector output port 150a designed to connect via a video cable 165a to a video port of a first RV, a first telephone interconnector output port 155a designed to connect via a telephone cable 165b to a telephone port of the first RV, a first Internet interconnector output port 160a designed to connect via an Internet or Ethernet cable 165d to an Internet or Ethernet port of the first RV, a second video interconnector output port 150b designed to connect via a video cable 165a to a video port of a second RV, a second telephone interconnector output port 155b designed to connect via a telephone cable 165b to a telephone port of the second RV, and a second Internet interconnector output port 160b designed to connect via an Internet or Ethernet cable 165d to an Internet or Ethernet port of the second RV. In the embodiment of FIG. 1, the input cables 135 might comprise one or two video cables 135a, two telephone cables 135b, and two Internet or Ethernet cables 135d.

In some cases, the two video interconnectors 150a and 150b might be embodied as one splitter with one input port and two output ports, as shown in the embodiment of FIG. 1B. In some instances, one or more of interconnectors 150-160 might have an input port that connects with a connector on the end of cables 135 and an output port that connects with a connector on the end of a corresponding cable 165 for interconnecting with ports of a media interconnection device on a RV or the like, as shown in the embodiment of FIG. 1B. Alternatively, or additionally, one or more of interconnectors 150-160 might have separate wired connections with cables 135 (not shown) and an output port that connects with a connector on the end of a corresponding cable 165 for interconnecting with ports of a media interconnection device on a RV or the like.

The inner lid 115 comprises a locking mechanism that prevents tampering by customers or non-customers. Although not shown in FIG. 1, a tamper resistant conduit, pipe, or other structure may be used to cover the exposed cables that extend above the ground surface for connecting the NAP and/or ONT (e.g., the NAP 515 and/or ONT 545 as shown in FIG. 5) with the MIB or media interconnection device 100. In some instances, where the post (e.g., post 420 of FIGS. 4 and 5) is a hollow metal tube or pipe, the input cables 135 might be routed through the hollow metal tube or pipe, with a short tamper resistant conduit, pipe, or other structure connecting the hollow metal tube or pipe of the post to the input portion of the MIB 100. Alternatively, instead of routing the input cables 135 through the short tamper resistant conduit, pipe, or other structure, a hole can be made in the back of the inner compartment of the MIB 100 overlaid over an opening in the hollow metal tube or pipe of the post, thereby increasing the tamper resistance of the device 100.

Figure 2A:
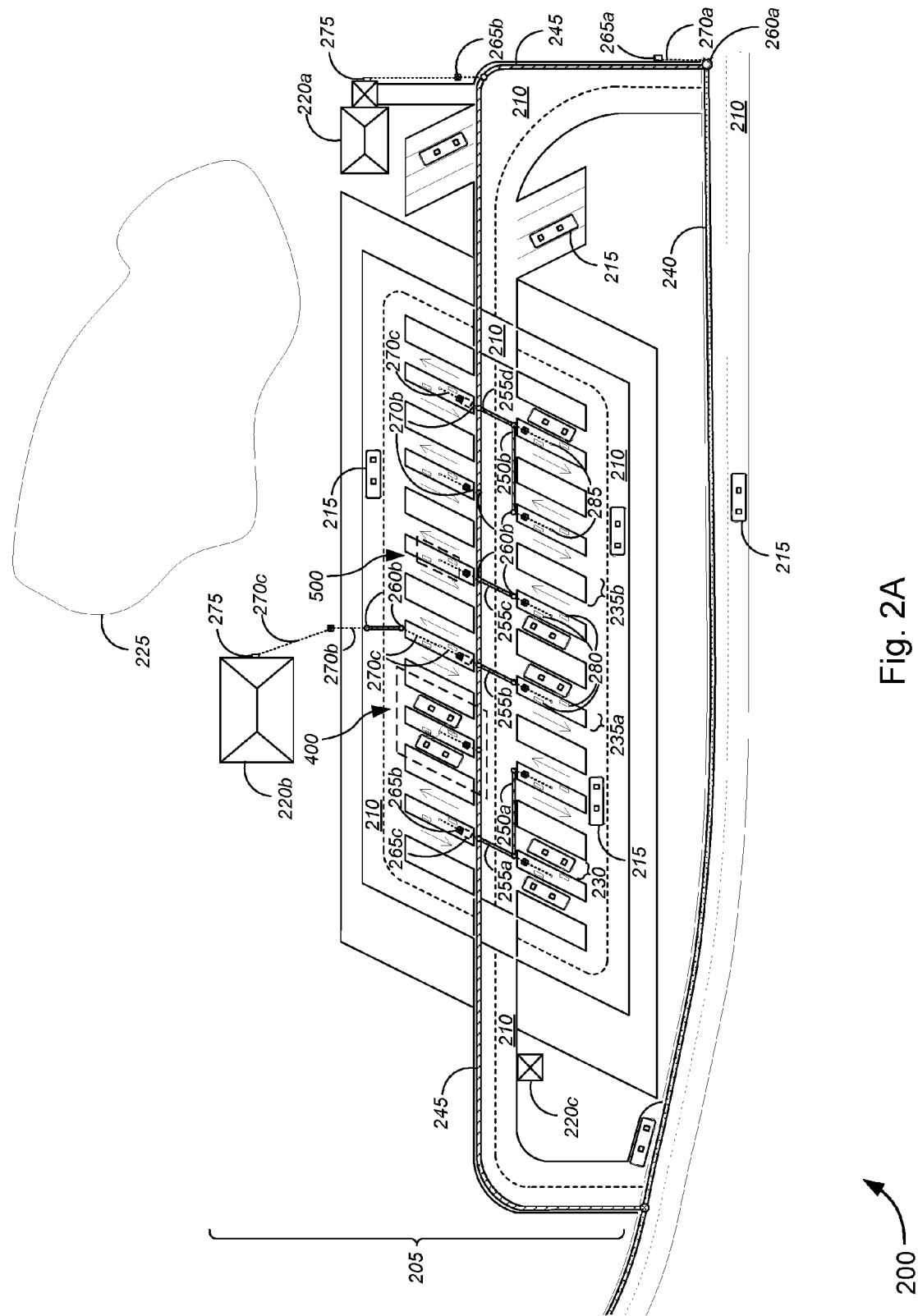
FIG. 2A is a general schematic diagram illustrating a system for implementing Fiber-to-Drop-Point ("FTDP") and/or point-to-point fiber insertion within a passive optical network ("PON") communications system using a plurality of media interconnection devices disposed throughout a recreational vehicle ("RV") park, in accordance with various embodiments.
Figure 2B:
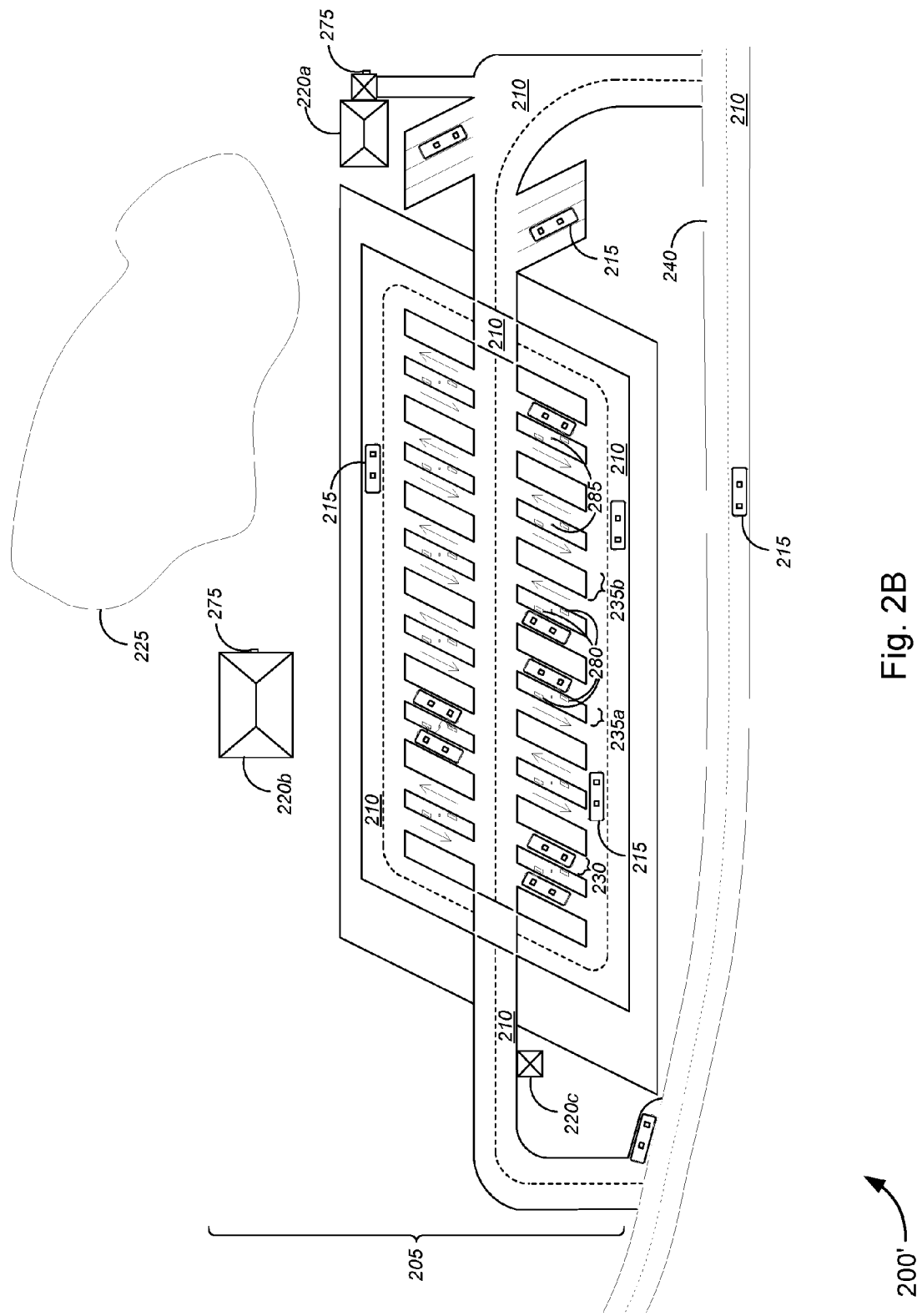
FIG. 2B is a general schematic diagram illustrating a system for implementing a plurality of media interconnection devices disposed throughout a recreational vehicle ("RV") park using traditional ground-based or buried line interconnections, in accordance with various embodiments.

FIGS. 2A and 2B (collectively, "FIG. 2") depict two alternative embodiments for implementing a plurality of MIBs or media interconnection devices (such those shown in FIG. 1). FIG. 2A is a general schematic diagram illustrating a system 200 for implementing Fiber-to-Drop-Point ("FTDP") and/or point-to-point fiber insertion within a passive optical network ("PON") communications system (using a apical conduit system as described in the Related Applications) using a plurality of media interconnection devices disposed throughout a recreational vehicle ("RV") park, in accordance with various embodiments. FIG. 2B is a general schematic diagram illustrating a system 200' for implementing a plurality of MIBs or media interconnection devices disposed throughout a recreational vehicle ("RV") park using traditional ground-based or buried line interconnections, in accordance with various embodiments. Although not shown, the plurality of MIBs or media interconnection devices may be implemented using a combination of the apical conduit system and the traditional ground-based or buried line interconnections. For simplifying the illustration, the RV park 205 is shown in FIGS. 2A and 2B having a particular configuration and showing 24 parking slots for RVs. However, the various embodiments are not so limited, and any arrangement of the RV park and the number, size, and orientation of the parking slots for RVs may be applicable to accommodate any make, model, and size of RV, as appropriate or desired. Moreover, the tools and techniques described herein may be implemented for established RV parks or newly constructed RV parks, as well as for other bulk service application sites.

In the non-limiting examples of FIG. 2, system 200 might comprise the RV park (or other bulk service application site) 205 that is accessible by a main road 210, with a road system 210 running through the RV park 205. One or more RVs (or other vehicles) 215 might travel along the main road 210 or road system 210 through the RV park 205. The RV park (or other bulk service application site) 205 might comprise one or more facilities 220, including, but not limited to, a front office or RV park owner premises 220*a*, one or more park facilities 220*b*, a park entrance/exit booth 220*c*, and/or the like. In some embodiments, the one or more park facilities 220*b* might include, without limitation, one or more of one or more indoor kitchen(s), one or more barbecue areas, one or more picnic tables, one or more bathhouses or shower facilities, one or more restrooms, one or more convenience stores, one or more dump stations, one or more exercise rooms, one or more gift shops, one or more laundry facilities, one or more recreation halls, one or more swimming pools, one or more bars or restaurants, and/or the like. In some instances, the RV park (or other bulk service application site) 205 might be located in close proximity to a natural or man-made structure or landmark 225 (such as a lake (as depicted in FIG. 2), a mountain, a mountain range, a hiking trail or hiking trail system, an open field, a town, a river, etc.).

In some embodiments, the RV park (or other bulk service application site) 205 might have located therein one or more RV parking slots 230 (which are depicted in FIG. 2 as angled parking slots sandwiched between two medians 235, for the sake of illustration). The medians 235 might include, without limitation, any of grass, concrete, dirt, gravel, asphalt, or any combination of these materials. As shown in the non-limiting embodiment of FIG. 2, the medians 235 might comprise a first set of medians 235*a* and a second set of medians 235*b*, each first median 235*a* being in alternating arrangement with each second median 235*b* along each row of RV parking slots 230. The first set of medians 235*a* might each have disposed therein two sets of RV interconnections 280 (including, but not limited to, electrical interconnections, water interconnections, and waste dump interconnections, or the like) and a MIB or media interconnection device 285 that is configured to service two RVs. Herein, "roadway" might refer to any type of path on which people, vehicles, and the like might travel, and might include asphalt roads, concrete roads, and/or the like. In some cases, the surface of the parking slots 230 might be the same as the surface of roadway 210 (e.g., asphalt or concrete). In other cases, the surface of roadway 210 might be asphalt while the surface of the parking slots 230 might be concrete, or vice versa.

With reference to the embodiment shown in FIG. 2A, the various embodiments allow for any layout and arrangement of the apical conduit system and components (including, without limitation, source slot, main slot(s), cross-slots, far-side slots, bore holes, missile bores, and/or the like), not necessarily as shown in FIG. 2A; the particular layout and arrangement of the apical conduit system and components in FIG. 2A represents only one particular set of embodiments.

Further, in FIG. 2A, each network access point ("NAP") 265*c* is configured to serve more customers (i.e., 8 RVs or RV parking slots in the example of FIG. 2A), and thus fewer NAPs 265*c* need be deployed. In some embodiments, the use of simplex or duplex fiber optic lines might determine how many ports each NAP might have, and thus how many customers (i.e., RVs or RV parking slots) can be served by each NAP; of course, the use of duplex lines allows for double the capacity, and thus can serve more customers (i.e., RVs or RV parking slots) compared with simplex lines. According to some embodiments, FIG. 2A might represent a system that incorporates a PON communications system, which utilizes single (duplex) fiber connections to the customers (i.e., RVs or RV parking slots) 230, and thus may require only 1 single (duplex) fiber line to be routed from the NAP 265*c* to each customers (i.e., RVs or RV parking slots) 230 (i.e., to the NID or ONT of the customers (i.e., RVs or RV parking slots) 230). In some cases, a second single (duplex) fiber line might be routed along with the first single (duplex) fiber line to serve as a backup or to allow for other services that require simplex connections. The various embodiments, however, are not limited to the embodiment as shown in FIG. 2A, and the NAPs 265*c* can each be configured to serve any suitable number of customers (i.e., RVs or RV parking slots).

System 200, as shown in FIG. 2, might include, on roadway 210, apical conduit source slot 240, one or more apical conduit main slots 245, one or more apical conduit far-side slots 250, one or more apical conduit cross slots 255, road bores 260, and/or the like. Herein, "apical conduit" might refer to any type of conduit, groove, or channel disposed in a ground surface (particularly, a roadway, parking, or pathway surface), in which one or more lines are disposed. The one or more lines or one or more sets of lines might include, without limitation, at least one of one or more conduits, one or more optical fiber cables, one or more telephone cables, one or more video cables, one or more non-fiber Internet cables, one or more conductive signal lines, one or more power lines, and/or the like. The conduit, groove, or channel may be covered with a filler material, including, but not limited to, a thermosetting material (which might include polyurea or the like). In some cases, a capping material might be placed on top of the filler material of the apical conduit, and the capping material might be set to have particular colors, so as to additionally serve (in some cases) as road lines on a roadway surface.

Road bores 260 provide vertical access, from a top surface of roadway 210, to the one or more lines disposed within (typically at or near the bottom of) the groove or channel of the apical conduit slots, and can be filled with the filler and/or capping material similar to any of the apical conduit slots 240-255. In some embodiments, road bores 260 might have diameters ranging from ~0.5 inches (~1.3 cm) to ~6 inches (~15.2 cm), preferably ~6 inches (~15.2 cm) for road bores 260 near FDHs, cabinets, and/or the like, and preferably ~2 inches (~5.1 cm) for most other road bores 260.

In the example of FIG. 2A, the source slot 240 might extend from a central office ("CO"), a digital subscriber line access multiplexer ("DSLAM"), and/or near/within a block or local site of customers (i.e., RV park) (collectively, "source"), extending along, under, or beside portions of a roadway curb (not shown). The source slot 240 might carry (or might otherwise have placed in a channel therein) at least one line from the source, including, without limitation, one or more F-1 fiber cables, and/or the like. In some embodiments, the at least one line might further comprise, but is not limited to, at least one of one or more telephone cables, one or more video cables, one or more non-fiber Internet cables, one or more conductive signal lines, one or more power lines, and/or the like.

Further, in the embodiment of FIG. 2A, the main slot 245 might extend along a significant length of roadway 210, disposed close to one of the curbs of medians 235, while far-side slot 250 extends along a shorter length of roadway 210 on the side of the roadway 210 opposite to the side along which the main slot 245 is disposed. Cross slots 255 connect main slot 245 with far-side slot 250, and thus are disposed across an approximate width of the roadway 210. Although main slot 245 and far-side slot 250 are shown in FIG. 2A to be parallel to each other, they may be at any suitable angle with respect to each other, so long as they are at appropriate positions along the roadway 210 and/or beside medians 235 (e.g., in some cases, to serve as road lines, or the like, which in some cases might mean that one of the main slot 245 or the far-side slot 250 is positioned in the middle of the roadway 210 to serve as a middle road line). Although cross slots 255 are shown in FIG. 2A as being angled with respect to at least one of main slot 245 and far-side slot 250 or being parallel with the medians 235, cross slots 255 may be at any suitable angle relative to one or both of main slot 245 and far-side slot 250 (perpendicular to at least one of main slot 245 and far-side slot 250), so long as cross slots 255 connect main slot 245 with far-side slot 250, such that the one or more lines may be appropriately routed through these slots 240-255.

In some embodiments, one or more ground-based distribution devices 265 might be provided to service one or more customers (i.e., RVs or RV parking slots) 230. The one or more lines disposed in the apical conduit slots 240-255 might be routed underground, via conduits, missile bores, or the like (collectively, "conduits 270"), to containers of each of the one or more ground-based distribution devices 265, in a manner as described in detail herein with respect to FIGS. 2A and 3-5, and as described in detail in the '676 Application, which has already been incorporated herein by reference in its entirety. In some embodiments, conduits 270c might be provided below ground between a container of a ground-based distribution device 265 to a position below and near a NID or ONT 275 that is mounted on an exterior wall of a facility 220 or below and near a MIB or media interconnection device 285 (i.e., to service two or more RVs or RV parking slots). In some cases, conduits 270c might extend from the position below and near the NID or ONT 275 or below and near the MIB or media interconnection device 285 to communicatively couple with the appropriate wiring connections (i.e., with the optical fiber connections, conductive signal connections, and/or the like) within the NID or ONT 275 or within the MIB or media interconnection device 285. Although shown in FIG. 2A as being a direct route between the position near the MIB or media interconnection device 285 (or the NID or ONT 275) and the container of the ground-based distribution device 265, conduit 270c may be at right-angles, may be curved, and/or might follow other routes. In some embodiments, the ground-based distribution device 265 might include, without limitation, a FDH platform 265a, a hand hole 265b, a NAP 265c (which might be an above-surface platform NAP, a sub-surface NAP (which might extend from above the surface to below the surface), or a direct-bury NAP, or the like), and/or the like. Although the FDH platform 265a is shown communicatively coupled to the apical conduit system through the main slot 245, in some embodiments, the FDH platform 265a may be coupled to the apical conduit system through the source slot 240. In some instances, the FDH platform 265a might link two or more apical conduit systems (either through the main slots and/or source slots of these systems).

In some embodiments, the combination of main slot 245, far-side slot 250, and/or cross slots 255 might form particular configurations including, without limitation, an "h" configuration (i.e., as shown in the combination of main slot 245, far-side slot 250a, and cross slot 255a, or the combination of main slot 245, far-side slot 250b, and cross slot 255d, in FIG. 2A), a "c" configuration (i.e., as shown in the combination of main slot 245 and cross slots 255b and 255c in FIG. 2A), and/or the like. The "h" and "c" configurations each provide ways of routing lines from NAP 265c to hand holes 265b on the opposite side of roadway 210 to service the one or more MIBs or media interconnection devices 285 (or NIDs and ONTs 275) across the road 210. Any other suitable configuration may be implemented, however.

FIG. 2B depicts an alternative embodiment for implementing the plurality of MIBs or media interconnection devices (e.g., MIBs 100 of FIG. 1) that does not utilize the apical conduit system as shown and described with reference to FIG. 2A. Rather, system 200' of FIG. 2B utilizes traditional ground-based or buried line interconnections, which includes direct buried cables, conduits, and/or the like in the ground, that feed source lines (including, but not limited to, one or more telephone cables, one or more video cables, one or more non-fiber Internet cables, one or more conductive signal lines, one or more power lines, one or more optical fiber lines, and/or the like) underground to a location underneath or near each MIB 100. The source lines are then fed into the MIB 100, so as to communicatively couple to the output ports 150-160 (i.e., video, telephone, and/or Internet ports), as shown in FIG. 1, with corresponding services (i.e., video service, telephone service, and/or Internet service offered by at least one service provider). The embodiment of FIG. 2B is otherwise similar to that of FIG. 2A, and similar descriptions apply as appropriate.

Figure 3D:
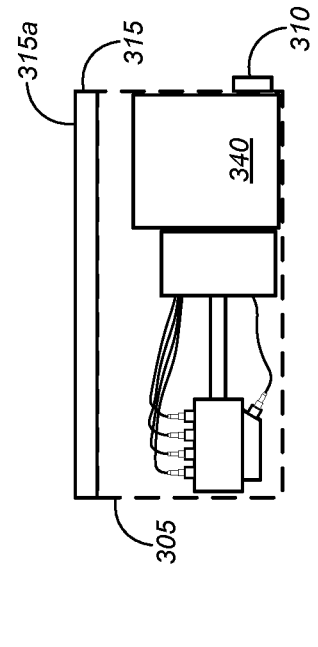

We now turn to FIGS. 3A-3J (collectively, "FIG. 3"), which are general schematic diagrams illustrating various ground-based signal distribution devices that may be used in implementing FTDP and/or point-to-point fiber insertion within a PON communications system, in accordance with various embodiments. In FIG. 3, dash-lined boxes, covers, or containers depict outlines of said boxes, covers, or containers in order to illustrate examples of contents disposed therein. Although particular configurations and components are shown in FIG. 3, the various embodiments are not necessarily limited to those configurations and components shown, but may include any suitable configurations and/or components, as appropriate or as desired. FIGS. 3A-3D depict various example embodiments of FDHs 265a, while FIGS. 3E-3H depict various example embodiments of handholes 265b, and FIGS. 3I-3J depict example embodiments of NAPs 265c.

In FIGS. 3A-3B, a pedestal-based FDH 265a is shown, which comprises, without limitation, a container 305, at least one conduit port 310, a cover or lid 315, and a cable distribution system 320. The container 305 might include a square or rectangular box that is made of a material that can durably and resiliently protect contents thereof while being disposed or buried in the ground surface (i.e., disposed or buried under the ground surface), and especially against damage caused by shifting ground conditions (such as by expansive soils, tremors, etc.). The container 305 is ideally constructed to be waterproof to protect electronics components disposed therein from getting wet; such a waterproof container can also protect against entry of dust, dirt, debris, and the like, which might affect or damage optical cables and/or optical cable connections. In some embodiments, cable distribution system 320—which is at least in part disposed in the pedestal portion that is above container 305 (and covered by or disposed within lid 315 during operation)—might include, but is not limited to, a signal distribution/splitting/splicing system 320a, a support structure 325, one or more first cables 330, and one or more second cables 335. In some cases, FDH 265a might further comprise an optional cable routing system 340, which is a system disposed in container 305 to route the one or more first and second cables 330 and 335 between the cable distribution system 320 and the at least one conduit port 310. In some embodiments, the optional cable routing system 340 might be disposed in the pedestal portion along with the cable distribution system 320 (not shown). In other embodiments, both the optional cable routing system 340 and the cable distribution system 320 might be disposed in the container 305 (also not shown). Embodiments of the optional cable routing system are described in greater detail below with respect to FIG. 6A or with respect to FIGS. 8-10 of the '851 Application.

According to some embodiments, the one or more first cables 330 might include, without limitation, F-1 or F1 optical fiber cables routed from a CO, a DSLAM, and/or near/within a block or neighborhood of customer premises or near/within a block or neighborhood of customers (i.e., RVs or RV parking slots) (collectively, "source") to the FDH 265a, while the one or more second cables 335 might include, but are not limited to, F-2 or F2 optical fiber cables routed between the FDH 265a and one or more NAPs 265c.

Figure 3C:
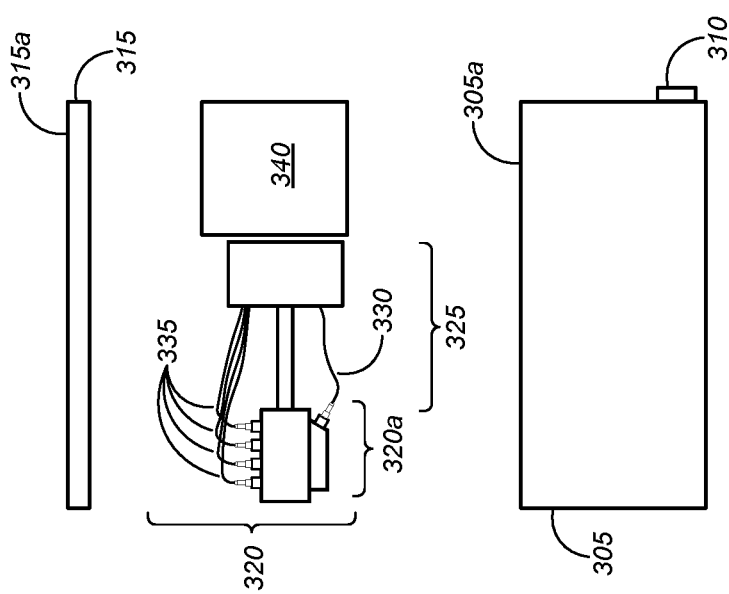

The embodiments of FIGS. 3C-3D are similar, if not identical, to those of FIGS. 3A-3B, except that the FDH 265a of FIGS. 3C-3D are substantially disposed within the ground surface, with either top surface 305a (of container 305) or top surface 315a (of lid 315) being substantially level with a top surface of the ground surface, and without a pedestal portion. In these embodiments of FDH 265a, the signal distribution/splitting/splicing system 320a, the support structure 325, the one or more first cables 330, the one or more second cables 335, and the (optional) cable routing system 340 are all disposed within the container, and all covered by substantially flat lid 315. Because of the similarity of the components therein, the description of FDH 265a in FIGS. 3A-3B is applicable to the FDH 265a of FIGS. 3C-3D.

The hand holes 265b of FIGS. 3E-3H are similar, if not identical, to the hand holes described in detail in the '676 Application, which is already incorporated by reference herein in its entirety. With reference to FIGS. 3E-3H, an embodiment of hand hole 265b is shown in FIG. 3E, which hand hole 265b comprises a container 305, at least one conduit port 310, a lid 315, a cable distribution system 320, and an (optional) antenna 345. The container 305 might be similar, if not identical, to the container 305 described in detail with respect to FIGS. 3A-3D; accordingly, the descriptions above apply similarly to container 305 in FIGS. 3E-3H. The (optional) antenna 345 is configured to be disposed or mounted within the interior of the container 305, and can include any suitable antenna, antenna array, or arrays of antennas, as described in detail with respect to FIG. 3 of the '676 Application, or any other suitable antenna, antenna array, or arrays of antennas. The lid 315 is ideally made of a material that provides predetermined omnidirectional azimuthal rf gain.

The at least one conduit port 310 is configured to sealingly connect with the one or more conduits 270b or 270c. In this manner, at least one optical fiber line, at least one conductive signal line (including, but not limited to, copper data lines, copper voice lines, copper video lines, or any suitable (non-optical fiber) data cables, (non-optical fiber) video cables, or (non-optical fiber) voice cables, and/or the like), and/or the like that are provided in the one or more conduits 270b might be routed through the at least one conduit port 310 and into the interior of the container 305, to be correspondingly communicatively coupled to the antenna 345 or to the NIDs/ONTs 275 via cable distribution system 320. Cable distribution system 320 may also be configured to route (via container 305) the at least one power line that is provided in the one or more conduits 205 to appropriate power receptacles, cabinets, or power relay systems that are located above the ground surface.

FIG. 3F shows another embodiment of hand hole 265b. In FIG. 3F, the hand hole 265b comprises (optional) antenna 345, which is part of lid 315, either disposed completely within the lid 315, disposed below (but mounted to) the lid 315, or disposed partially within the lid 315 and partially extending below the lid 315. Hand hole 265b in FIG. 3F is otherwise similar, or identical to, and has similar, or identical, functionalities as hand hole 265b shown in, and described with respect to, FIG. 3E. Accordingly, the descriptions of the hand hole 265b of FIG. 3E are applicable to the hand hole 265b of FIG. 3F.

FIGS. 3G and 3H show two embodiments of flowerpot hand holes 265b. The differences between the hand holes 265b of FIGS. 3E and 3F and the flowerpot hand holes 265b of FIGS. 3G and 3H include a more compact structure (and a correspondingly compact set of (optional) antenna(s) 345 and cable distribution systems 320), a container 305 having a generally cylindrical or (truncated) conical shape (not unlike a flower pot for planting flowers), a lid 315 having a generally circular shape to fit the generally cylindrical or conical container 305, and the like. The flowerpot hand holes 220 are otherwise similar, or identical to, and have similar, or identical, functionalities as hand holes 265b of FIGS. 3E and 3F, respectively. Accordingly, the descriptions of hand holes 265b of FIGS. 3E and 3F are respectively applicable to the flowerpot hand holes 265b of FIGS. 3G and 3H.

According to some embodiments, a wide range of hand holes (some including the hand holes 265b above) may be used, with polymer concrete lids of various shapes and sizes. In some cases, all splitting and/or splicing can be performed below the ground surface and no pedestal is added. In some instances, some splitting and/or splicing (e.g., using cable distribution system 320, or the like) can be performed above the ground surface, such as in pedestal type FDH 265a (shown in FIGS. 3A-3B) or other platforms, including, without limitation, pedestal platforms, NAP platforms, FDH platforms, and/or the like shown in FIG. 2 of the '676 Application, already incorporated herein by reference in its entirety.

In some embodiments, if the hand hole is not placed in a driveway or sidewalk, or the like, the lid 315 (as shown in FIGS. 3E-3H) may be replaced by a pedestal lid 315 (such as shown in FIGS. 3G-3J), or the like. In other words, a small (i.e., short) radio-only pedestal (or pedestal lid) can be added, with no need for any splitter, any splice tray, or the like, just a simple antenna structure. The result might look like a few-inch high (i.e., a few-centimeter high) pedestal with antenna structures as described in the '676 Application.

An advantage with this approach is that the radio pedestal can be easily replaced, maintained, or the like, as it contains only the radio element.

Merely by way of example, in some instances, polymer concrete lids (such as used with typical hand holes) may be built with antenna elements in the lids. In particular, a ground plane can be placed below the lid, and the polymer concrete can be considered a low dielectric constant (i.e., as it has a dielectric constant or relative permittivity $\in_r$ similar to that of air—namely, $\in_r$ of about 1.0). In some cases, patch elements and/or directors may be included within the lid, subject to manufacturing processes.

Alternatively, planar antennas (such as described in detail in the '676 Application) may be placed below the lid, with the concrete surface having negligible impact on radio frequency propagation. A low elevation (i.e., below street level) setting of the radio typically limits the distance of propagation of rf signals. However, architectures having hand holes placed every few customers (i.e., RVs or RV parking slots) (or every few customer premises or homes) in a particular area (i.e., neighborhood or block of customers (i.e., RVs or RV parking slots) or neighborhood or block of customer premises) may sufficiently compensate for the limited distance of rf signal propagation. Some embodiments include hand holes 265b without any antennas 345.

In FIGS. 3I-3J, a NAP 265c is shown, which includes, without limitation, a base 305, a conduit port 310, a cover 315, and a cable distribution system 320. In some embodiments, cable distribution system 320 might include, but is not limited to, a signal distribution/splitting/splicing system 320b, a plurality of ports 320c, a support structure 325, one or more second cables 335, an (optional) antenna 345, and one or more third cables 350. In some cases, NAP 265c might be an above-surface NAP, a direct bury NAP, or a NAP disposed in the ground surface and extending above the ground surface. In some embodiments, the one or more second cables 335 might include, but are not limited to, F-2 or F2 optical fiber cables routed between the FDH 265a and one or more NAPs 265c, while the one or more third cables 350 might include, without limitation, F-3 or F3 optical fiber cables routed between a NAP 265c and one or more NIDs/ONTs 275 (in some cases, via one or more hand holes 265b). In some embodiments, NAP 265c might further comprise an optional cable routing system 340 (not shown), not unlike the optional cable routing system 340, as shown and described in detail above with respect to FIGS. 3A-3D.

Figure 4:
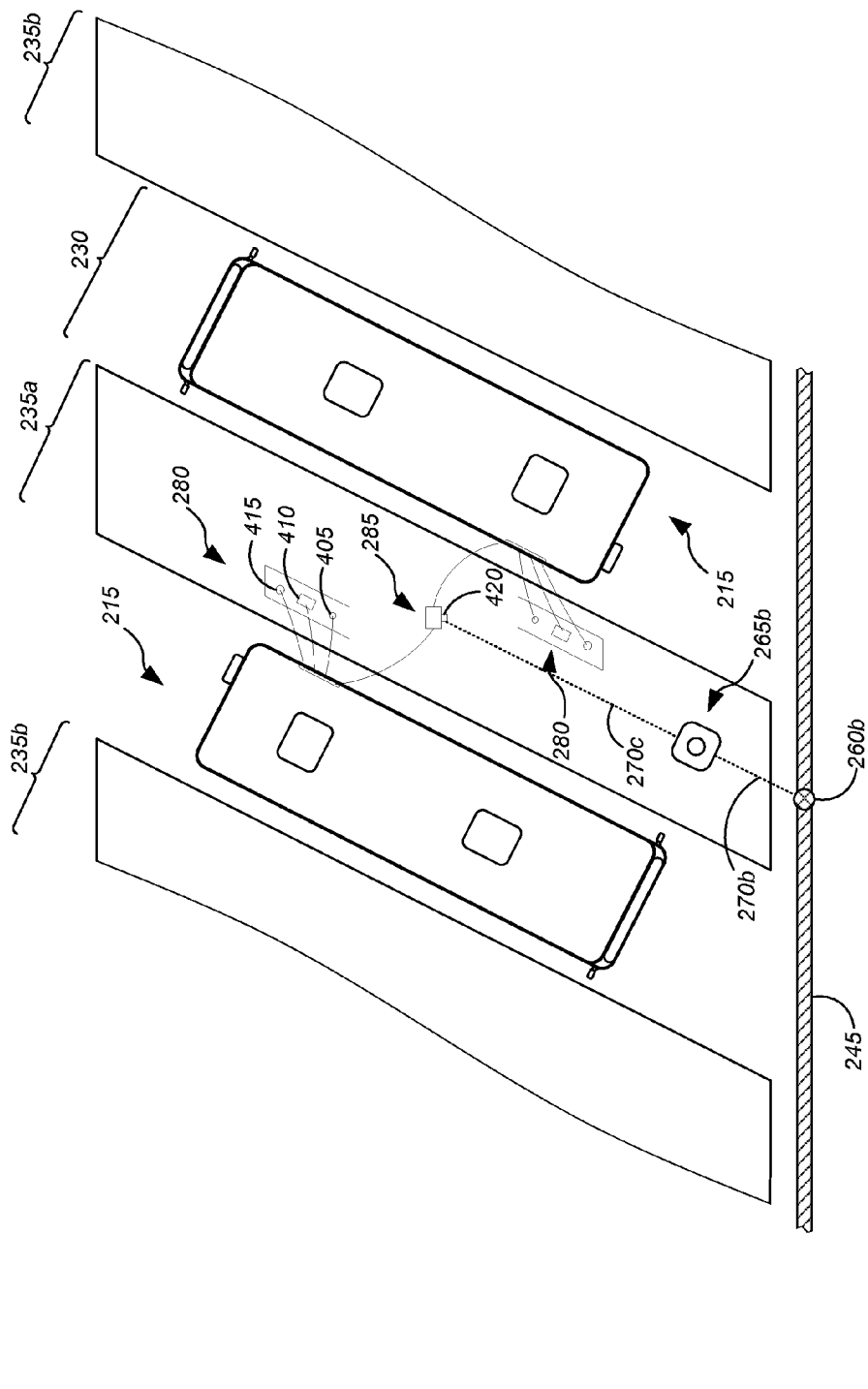
FIG. 4 is a general schematic diagram illustrating a view of a system for communicatively coupling lines within an apical conduit system and lines within one of the plurality of media interconnection devices for implementing FTDP and/or point-to-point fiber insertion within a PON communications system, in accordance with various embodiments.
Figure 5:
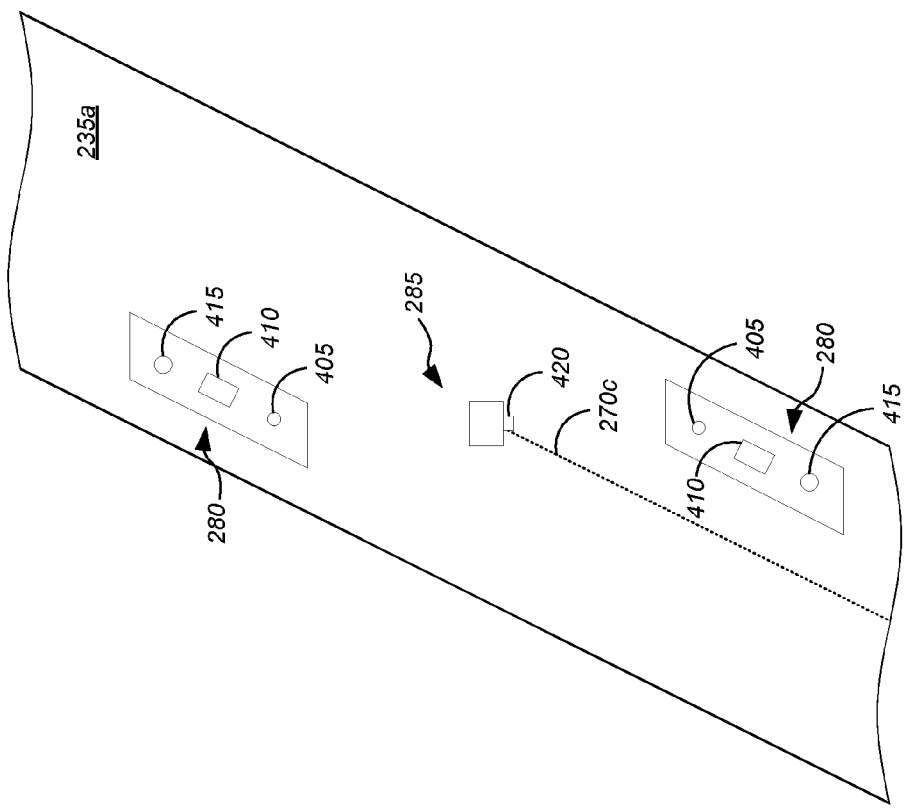
FIG. 5 is a general schematic diagram illustrating another view of the system for communicatively coupling lines within an apical conduit system and lines within one of the plurality of media interconnection devices for implementing FTDP and/or point-to-point fiber insertion within a PON communications system, in accordance with various embodiments.

FIG. 4 is a general schematic diagram illustrating a view of a system 400 for communicatively coupling lines within an apical conduit system and lines within one of the plurality of media interconnection devices for implementing FTDP and/or point-to-point fiber insertion within a PON communications system, in accordance with various embodiments. System 400 in FIG. 4 generally corresponds to a section of ground, as for example, indicated by (but not necessarily precisely depicted by) dash lined parallelogram 400 shown in FIG. 2A.

In the embodiment of FIG. 4, system 400 might comprise first median 235a between two second medians 235b. In between two adjacent medians 235 is an RV parking slot 230. As shown in FIG. 4, apical conduit main slot 245 might extend along roadway 210, and might be disposed close to one of the curbs of medians 235.

As shown in the embodiment of FIG. 4, two sets of RV interconnections 280 might be disposed on opposite sides of median 235a. Each set of RV interconnections 280 includes, but is not limited to, water interconnections 405 for providing clean water to an RV, electrical interconnections 410 for providing electricity to the RV, and waste dump interconnections 415 for allowing dumping sewage waste from the RV, or the like. In most RVs, water, electrical, and waste dump interconnections are typically on the left side of the vehicle, near the rear of the vehicle. Each set of RV interconnections 280 is thus designed to be within close proximity of this portion of an RV when the RV is properly parked in the parking slot 230. According to some embodiments, the MIB 285 might be disposed in between the two sets of RV interconnections 280 (in the non-limiting example of FIG. 4, disposed in the approximate middle of media 235a) and might be mounted on a post 420, which might be made of any suitable material, including, but not limited to, metal, wood, plastic, or concrete.

A borehole 260b provides vertical access, from a top surface of roadway 210, to one or more lines disposed within (typically at or near the bottom of) the groove or channel of the apical conduit main slot 245, and can be filled with the filler and/or capping material similar to any of the apical conduit slots 240-255, as described above. Conduit 270b might extend, for example within a missile bore, between main slot 245 to hand hole 265b. One or more sets of lines might be disposed within main slot 245 and conduit 270b, and might communicatively couple the hand hole 265b with a NAP 265c that is shown in FIG. 2A. Conduit 270c might extend, for example within another missile bore, between hand hole 265b and a position near or below MIB or media interconnection device 285. The one or more sets of lines might communicatively couple the hand hole 265b with the MIB or media interconnection device 285, via the conduit 270c.

In the example of FIG. 4, two exemplary RVs 215 are shown parked within the parking slots 230, with cables or conduits connecting each RV's water system with water interconnection 405 of the corresponding set of RV interconnections 280, connecting each RV's electrical system with electrical interconnection 410 of the corresponding set of RV interconnections 280, connecting each RV's sewage system with waste dump interconnection 415 of the corresponding set of RV interconnections 280, and connecting each RV's media system with MIB or media interconnection device 285.

FIG. 5 is a general schematic diagram illustrating another view of the system 500 for communicatively coupling lines within an apical conduit system and lines within one of the plurality of media interconnection devices for implementing FTDP and/or point-to-point fiber insertion within a PON communications system, in accordance with various embodiments. System 500 in FIG. 5 generally corresponds to a section of ground, as for example, indicated by (but not necessarily precisely depicted by) dash lined parallelogram 500 shown in FIG. 2A.

FIG. 5 depicts a zoomed-in view of a portion of one of the medians 235a of FIG. 2A. As shown in FIG. 5, two sets of RV interconnections 280—each with water interconnections 405 for providing clean water to an RV, electrical interconnections 410 for providing electricity to the RV, and waste dump interconnections 415 for allowing dumping sewage waste from the RV, or the like—and a MIB or media interconnection box 285 mounted on a post 420. A conduit 270c might extend, for example within another missile bore, between hand hole 265b (shown in FIG. 2A) and a position near or below MIB or media interconnection device 285. The median 235a, the two sets of RV interconnections 280, the MIB 285, the water interconnections 405, the electrical interconnections 410, the waste dump interconnections 415, and the post 420 of FIG. 5 might otherwise be similar, if not identical, to the median 235a, the two sets of RV interconnections 280, the MIB 285, the water interconnections 405, the electrical interconnections 410, the waste dump interconnections 415, and the post 420 of FIG. 4, and the descriptions of such components of FIG. 4 might similarly apply to corresponding components in FIG. 5.

Further, although not shown, the embodiments of FIG. 4 and FIG. 5 are applicable to the system 200' of FIG. 2B, except that instead of the apical conduit systems (i.e., the one or more apical conduit main slots 245, the road bores 260, the one or more ground-based distribution devices 265, and the conduits 270, or the like), system 200' would utilize traditional ground-based or buried line interconnections to interconnect source lines (including, but not limited to, one or more telephone cables, one or more video cables, one or more non-fiber Internet cables, one or more conductive signal lines, one or more power lines, one or more optical fiber lines, and/or the like) to the MIBs 285 (e.g., similar to MIBs 100 of FIG. 1). The embodiments 400 and 500 of FIGS. 4 and 5 would otherwise be similar to implementation for system 200' (not shown).

FIGS. 6A-6E (collectively, "FIG. 6") are general schematic diagrams illustrating various embodiments of a system 600 for communicatively coupling lines within an apical conduit system and lines within one of the plurality of media interconnection devices for implementing FTDP and/or point-to-point fiber insertion within a PON communications system (or alternatively, an Ethernet fiber communications system, an EPON, NGPON, or NGPON2 communications system, and/or the like), in accordance with various embodiments.

Figure 6A:
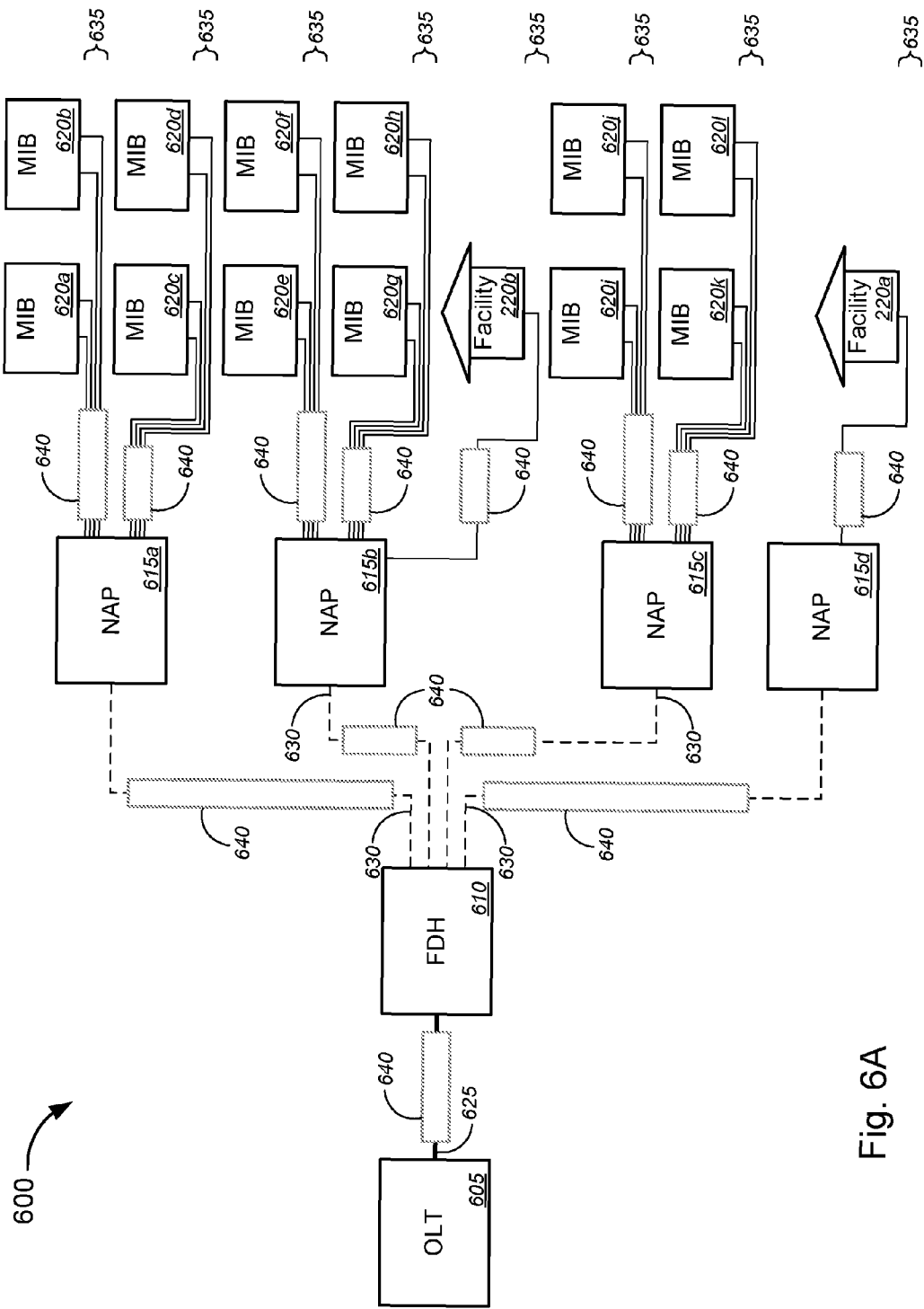
FIGS. 6A-6E are general schematic diagrams illustrating various embodiments of a system for communicatively coupling lines within an apical conduit system and lines within one of the plurality of media interconnection devices for implementing FTDP and/or point-to-point fiber insertion within a PON communications system, in accordance with various embodiments.

In FIG. 6A, system 600 might comprise an optical line terminal ("OLT") 605, a fiber distribution hub ("FDH") 610, a plurality of network access points ("NAPs") 615, a plurality of MIBs or media interconnection devices 620 (which may be disposed at a bulk service application site, such as a RV park or the like), and one or more facilities 220 (including, but not limited to, front office or RV park owner premises 220a and one or more park facilities 220b of FIG. 2A, or the like). The OLT 605 might be located at a central office or at a digital subscriber line access multiplexer ("DSLAM"), or the like, of a telecommunications service provider. In FIG. 6, F1 line 625 (between the OLT 605 and the FDH 610) is represented by a thick solid line, while each F2 line 630 (between the FDH 610 and each NAP 615) is represented by a dashed line, and each F3 line 635 (between each NAP 615 and each MIB 620 or each facility 220) is represented by a thin solid line. At least a portion of each of the F1 line 625, the F2 lines 630, and the F3 lines 635 is routed through at least a portion of an apical conduit component 640, which might include, without limitation, a missile bore(s), a bore hole(s), a conduit(s), and/or a channel of one or more of a source slot(s), a main slot(s), a cross slot(s), and/or a far-side slot(s), or the like (which are described in detail above). In various embodiments, the F3 lines 635 might each include a single (duplex) fiber line, while the F2 lines 630 might each include 8 main single (duplex) fiber lines and 4 spare single (duplex) fiber lines (for a total of 12 single (duplex) fiber lines), and the F1 lines 625 might include 16 to 24 fiber cables, each might include a single (duplex) fiber lines (as described in detail above), and one of the single (duplex) fiber lines 625 might communicatively couple to (and may be "split" by) an input port of a cable distribution device 645 (as described in detail in the '851 Application, which has already been incorporated herein by reference in its entirety). The MIBs 620a-620l (collectively, "MIBs 620") and the facilities 220a and 220b of FIG. 6A generally correspond to MIBs or media interconnection devices 280 and the facilities 220a and 220b of FIG. 2A, but are not so limited and may correspond to any suitable MIBs or facilities.

Figure 6B:
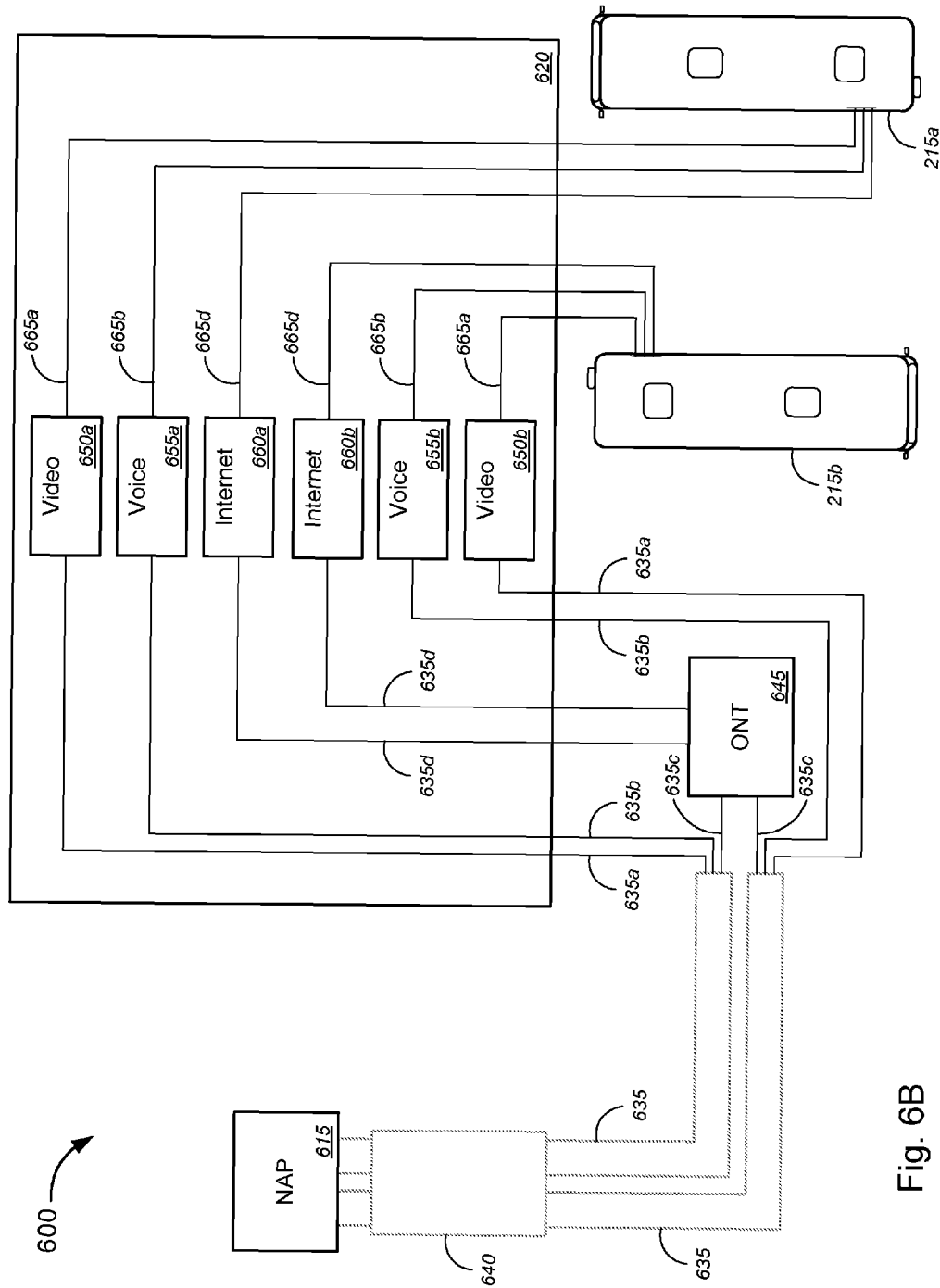

FIGS. 6B-6E depict various different or alternative embodiments of system 600 and/or MIB 620. With reference to FIG. 6B, a NAP 615 of the plurality of NAPs 615 of system 600 is shown in communication with one MIB 620 of the plurality of MIBs 620, via one or more lines 635, which are routed through at least a portion of an apical conduit component 640 (as described above). The one or more lines 635 might comprise two video cables 635a, two telephone cables 635b, and two optical fiber cables or Internet cables 635c. The MIB 620 might comprise two video interconnectors 650a and 650b, two voice interconnectors 655a and 655b, and two Internet interconnectors 660a and 660b. In some cases, the two video interconnectors 650a and 650b might be embodied as one splitter with one input port and two output ports (as shown, e.g., in the non-limiting embodiment of FIG. 6B). In some instances, one or more of interconnectors 650-660 might have an input port that connects with a connector on the end of cables 635 and an output port that connects with a connector on the end of a corresponding cable 665 for interconnecting with ports of a media interconnection device on a RV or the like. Alternatively, or additionally, one or more of interconnectors 650-660 might have separate wired connections with cables 635 and an output port that connects with a connector on the end of a corresponding cable 665 for interconnecting with ports of a media interconnection device on a RV or the like.

In the embodiment of FIG. 6B, system 600 might comprise an optical network terminal ("ONT") 645, which might be disposed between the NAP 615 and the MIB 620 (either disposed above ground or disposed underground). The two optical fiber cables 635c might communicatively couple to ONT 645, which might communicatively couple to the two Internet interconnectors via Ethernet-type cables 635d. As shown in the non-limiting example of FIG. 6B, each MIB 620 might serve two RVs 215a and 215b, or the like. One set of cables might communicatively couple with a first RV 215a, while the other set of cables might communicatively couple with a second RV 215b. Each set of cables might comprise a video cable 665a, a telephone cable 665b, and an Internet cable 665d, each of which might connect with an output port of the corresponding video interconnector 650, telephone interconnector 655, and Internet interconnector 660, respectively.

Although FIG. 6B shows all three of video, telephone, and Internet cables being connected to each RV 215, the various embodiments are not so limited, and any one or combination of these cables may be connected to an RV 215, without deviating from the scope of the various embodiments.

Figure 6C:
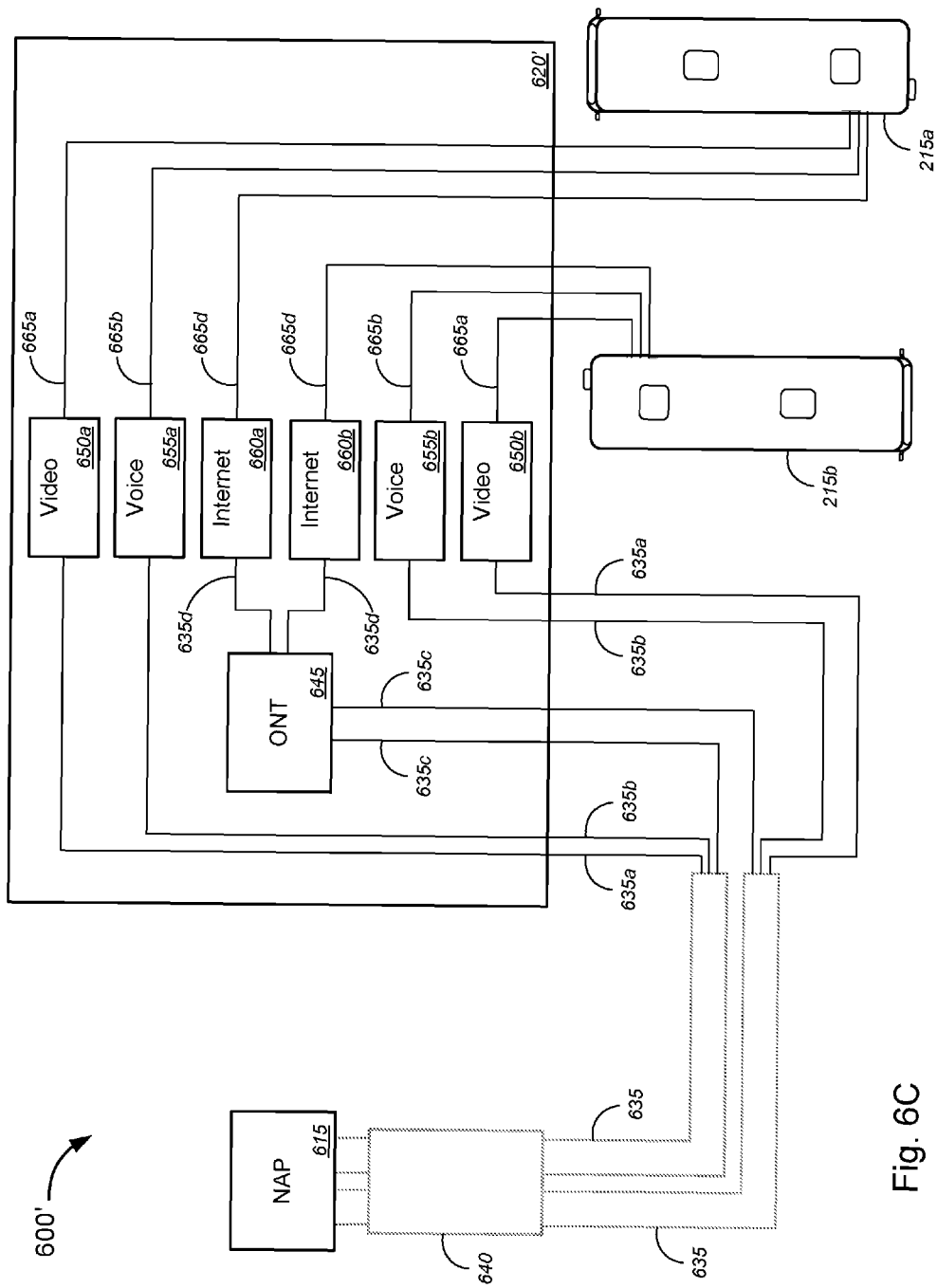

Turning to FIG. 6C, system 600' might comprise at least one MIB 620' that contains therein an ONT 645 (instead of the ONT 645 being disposed external to the MIB, in some cases, somewhere between the NAP 615 and the MIB 620, as shown in FIG. 6B). The NAP 615, the MIB 620', the lines 635, the cables 635a-635d, the apical conduit component 640, the ONT 645, the video interconnectors 650a and 650b, the telephone interconnectors 655a and 655b, the Internet interconnectors 660a and 660b, and the RVs 215a and 215b of FIG. 6C are otherwise similar, if not identical, to the NAP 615, the MIB 620, the lines 635, the cables 635a-635d, the apical conduit component 640, the ONT 645, the video interconnectors 650a and 650b, the telephone interconnectors 655a and 655b, the Internet interconnectors 660a and 660b, and the RVs 215a and 215b of FIG. 6B, respectively, and the descriptions of these components of FIG. 6B similarly apply to the corresponding components in FIG. 6C.

Figure 6D:
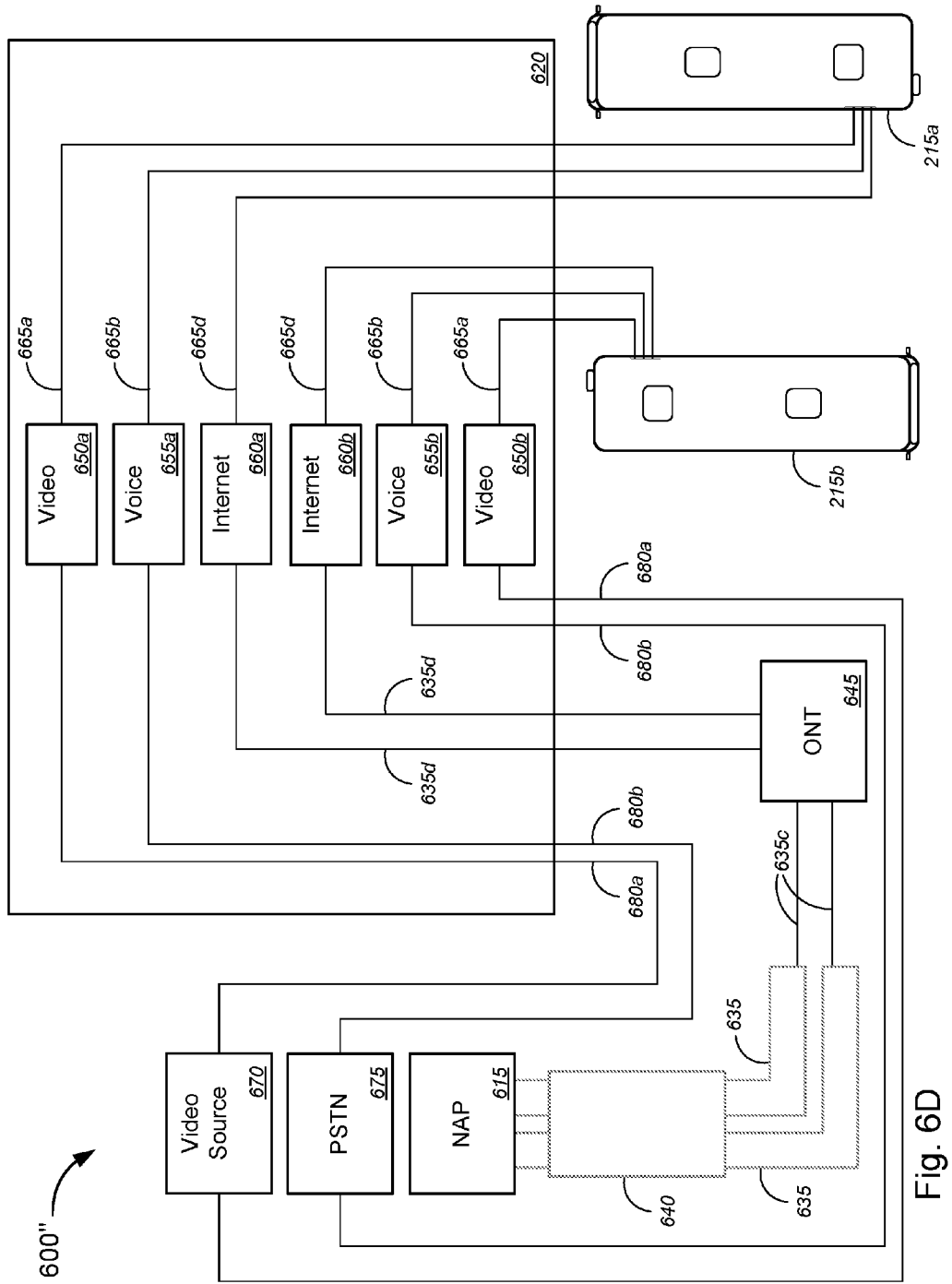
Figure 6E:
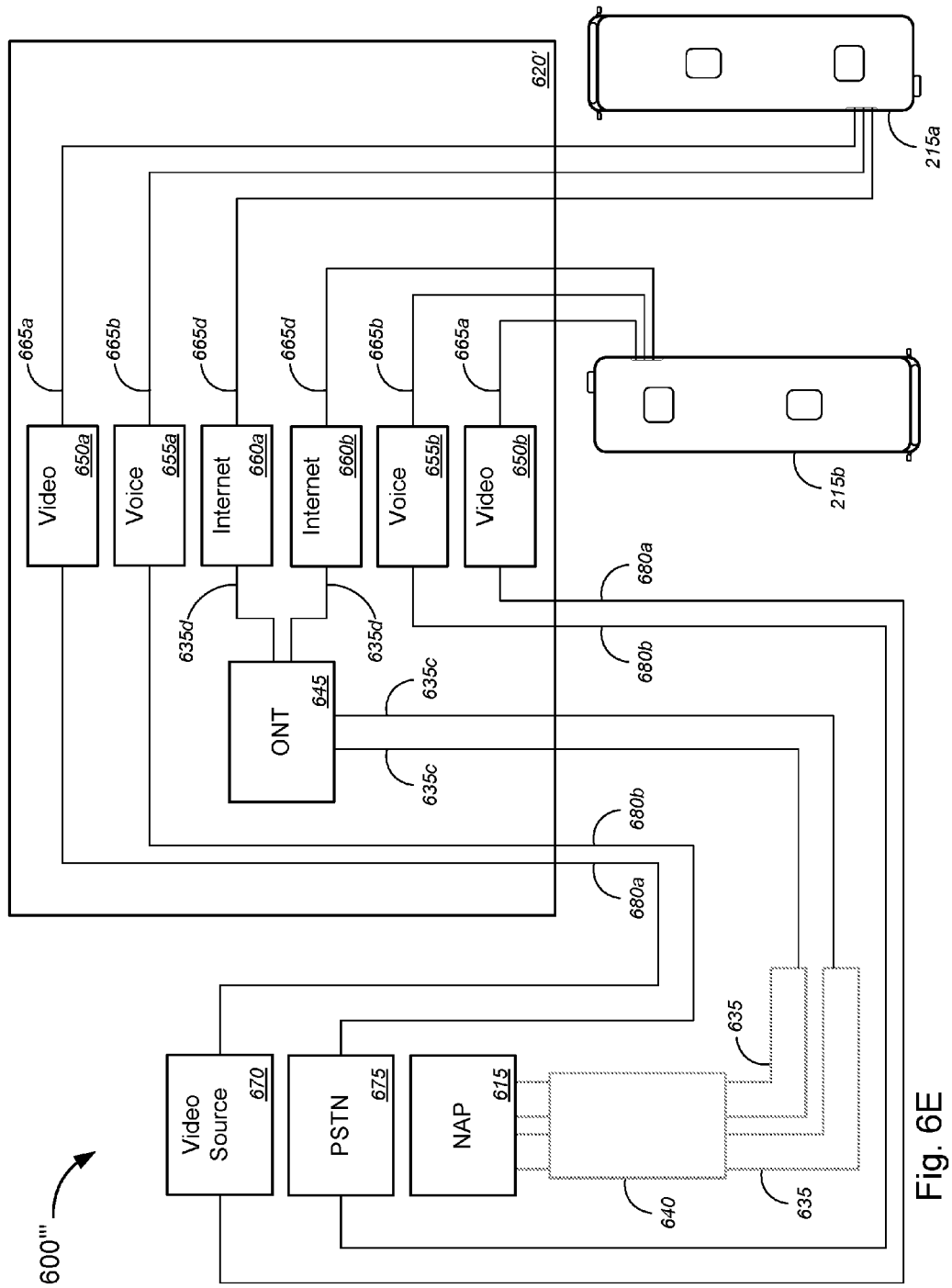

In the embodiments of FIGS. 6D and 6E, systems 600" and 600" are similar to systems 600 of FIG. 6B and 600' of FIG. 6C, respectively, except that only Internet service is provided through the apical conduit system from the OLT 605 through the NAP 615, while the video service is provided by a separate source 670 (which might be offered by the same or different service provider that offers the Internet service), and the telephone service is provided by a public switched telephone network ("PSTN") 675 (which might be offered by the same or different service provider that offers the Internet service and/or the same or different service provider that offers the video service). In FIGS. 6D and 6E, the video source 670 might communicatively couple with the two video interconnectors 650a and 650b via video cables 680a, while the PSTN 675 (offering plain old telephone service ("POTS")) might communicatively couple with the two telephone interconnectors 655a and 655b via telephone cables 680b.

The NAP 615, the MIB 620, the lines 635, the cables 680a, 680b, 635c, and 635d, the apical conduit component 640, the ONT 645, the video interconnectors 650a and 650b, the telephone interconnectors 655a and 655b, the Internet interconnectors 660a and 660b, and the RVs 215a and 215b of FIG. 6D are otherwise similar, if not identical, to the NAP 615, the MIB 620, the lines 635, the cables 635a, 635b, 635c, and 635d, the apical conduit component 640, the ONT 645, the video interconnectors 650a and 650b, the telephone interconnectors 655a and 655b, the Internet interconnectors 660a and 660b, and the RVs 215a and 215b of FIG. 6B, respectively, and the descriptions of these components of FIG. 6D similarly apply to the corresponding components in FIG. 6B. Likewise, the NAP 615, the MIB 620', the lines 635, the cables 680a, 680b, 635c, and 635d, the apical conduit component 640, the ONT 645, the video interconnectors 650a and 650b, the telephone interconnectors 655a and 655b, the Internet interconnectors 660a and 660b, and the RVs 215a and 215b of FIG. 6E are otherwise similar, if not identical, to the NAP 615, the MIB 620', the lines 635, the cables 635a, 635b, 635c, and 635d, the apical conduit component 640, the ONT 645, the video interconnectors 650a and 650b, the telephone interconnectors 655a and 655b, the Internet interconnectors 660a and 660b, and the RVs 215a and 215b of FIG. 6C, respectively, and the descriptions of these components of FIG. 6E similarly apply to the corresponding components in FIG. 6C.

Although not shown in FIG. 6, the video cables 635a or 680a might be communicatively coupled with a video signal decoder prior to coupling with video interconnector 650a or 650b. The video signal decoder might decode a scrambled video signal from a video service provider and might send a decoded video signal through one of the first video cable or the second video cable when a user associated with a corresponding one of the at least two separate customer networks in communication with the one of the first video cable or the second video cable subscribes to video service. In the case of FIG. 6, for example, each of the two separate customer networks might be a local area network ("LAN") within one of the RVs 215a or 215b, and a first video cable 635a or 680a might serve a first LAN in first RV 215a, while the second video cable 635a or 680a might serve a second LAN in second RV 215a. If the user associated with the first LAN in the first RV 215a subscribes to video service either from the service provider associated with the OLT 605 or the service provider associated with the video source 670, the video signal decoder might decode a scrambled signal from the OLT 605 or the video source 670 to allow viewing of the video content by the subscriber (i.e., user associated with the first LAN in first RV 215a, in this example). If, for instance, the user associated with the second LAN in the second RV 215b does not subscribe to video service from either the service provider associated with the OLT 605 or the service provider associated with the video source 670, the video signal decoder would not decode a scrambled signal from the OLT 605 or the video source 670 to allow viewing of the video content by the non-subscriber (i.e., user associated with the second LAN in second RV 215b, in this example). In some embodiments, the video signal decoder might be disposed within an external housing of MIB or media interconnection device 620 or 620'. In alternative embodiments, the video signal decoder might be located within a separate housing located within a video signal distribution hub that is located at a local site (e.g., RV park 205 of FIG. 2, in some cases within front office or RV park owner premises 220a of FIG. 2, or within one or more of signal distribution devices 265a-265c of FIGS. 1 and 2A, or the like).

Although also not shown in FIG. 6, the telephone cables 635b or 680b might be communicatively coupled with a private branch exchange ("PBX") that tracks local and long-distance usage over at least one of the first and second telephone cables by a corresponding user associated with at least one of the at least two separate customer networks corresponding to the at least one of the first and second telephone cables. For example, if the user associated with the first LAN in the first RV 215a subscribes to land-line telephone service or POTS (including at least one of local, long-distance, or international telephone service, or the like) either from the service provider associated with the OLT 605 or the service provider associated with the PSTN 675, the PBX might connect a call between the user and another call participant via the PSTN 675 or other telephone network, and might track local, long-distance, and/or international telephone usage to determine if usage is within the user's phone subscription and for billing the user if outside of the user's phone subscription. If, for instance, the user associated with the second LAN in the second RV 215b does not subscribe to land-line telephone service from either the service provider associated with the OLT 605 or the service provider associated with the video source 670, the PBX would not connect any calls over the telephone cables 635b or 680b either initiated by the user or intended for the user. In some embodiments, the PBX might be located at a local site (e.g., RV park 205 of FIG. 2, in some cases within front office or RV park owner premises 220a of FIG. 2, or within one or more of signal distribution devices 265a-265c of FIGS. 1 and 2A, or the like).

In some embodiments, the Internet cables 635d might provide Internet service and at least one of Internet-based video service or Voice over Internet Protocol ("VoIP") service to a user. For instance, if the user associated with the first LAN in the first RV 215a subscribes to Internet service and Internet-based video service, the user might not need to separately subscribe to video service over the video cables 635a or 680a from the OLT 605 or from the video source 670. Likewise, if the user associated with the second LAN in the second RV 215b subscribes to Internet service and VoIP service, the user might not need to separately subscribe to land-line telephone service over the telephone cables 635b or 680b from the OLT 605 or from the video source 670. In some cases, one of the users might subscribed to Internet service, Internet-based video service, and VoIP service, in which case, that user might simply connect the Internet cables 665d between Internet interconnector 660 and the corresponding port on his or her RV 215.

Figure 7A:
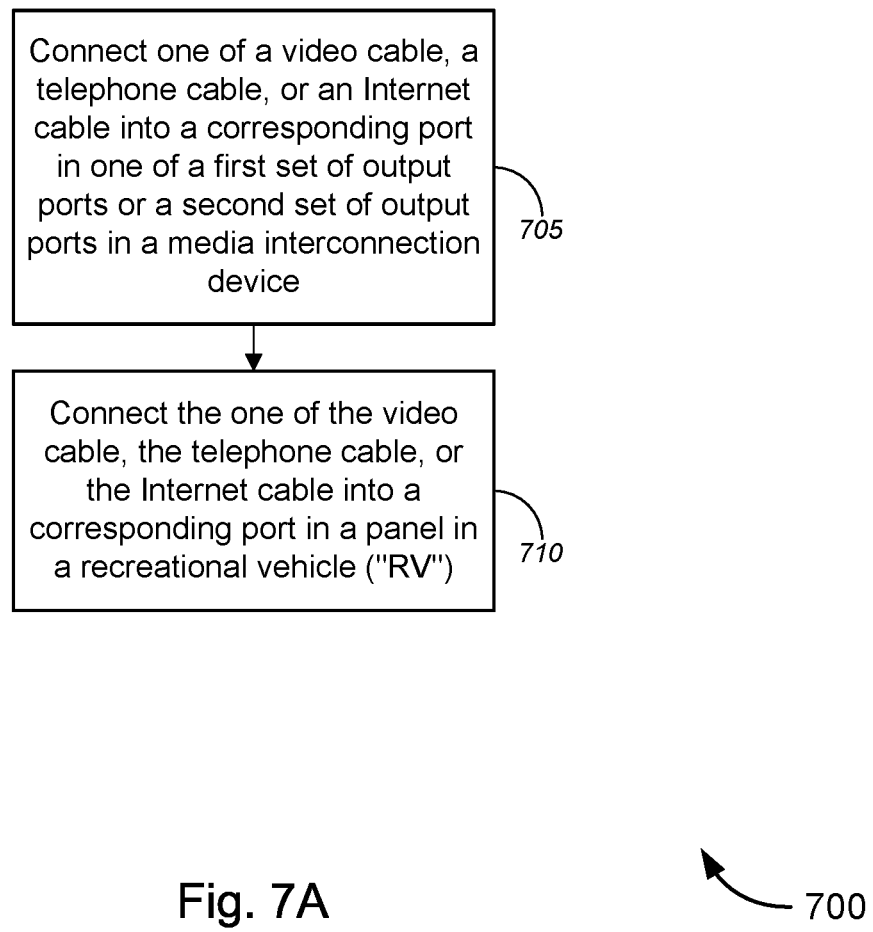
FIGS. 7A and 7B are flow diagrams illustrating various methods for implementing FTDP and/or point-to-point fiber insertion within a PON communications system using a plurality of media interconnection devices disposed throughout a RV park, in accordance with various embodiments.
Figure 7B:
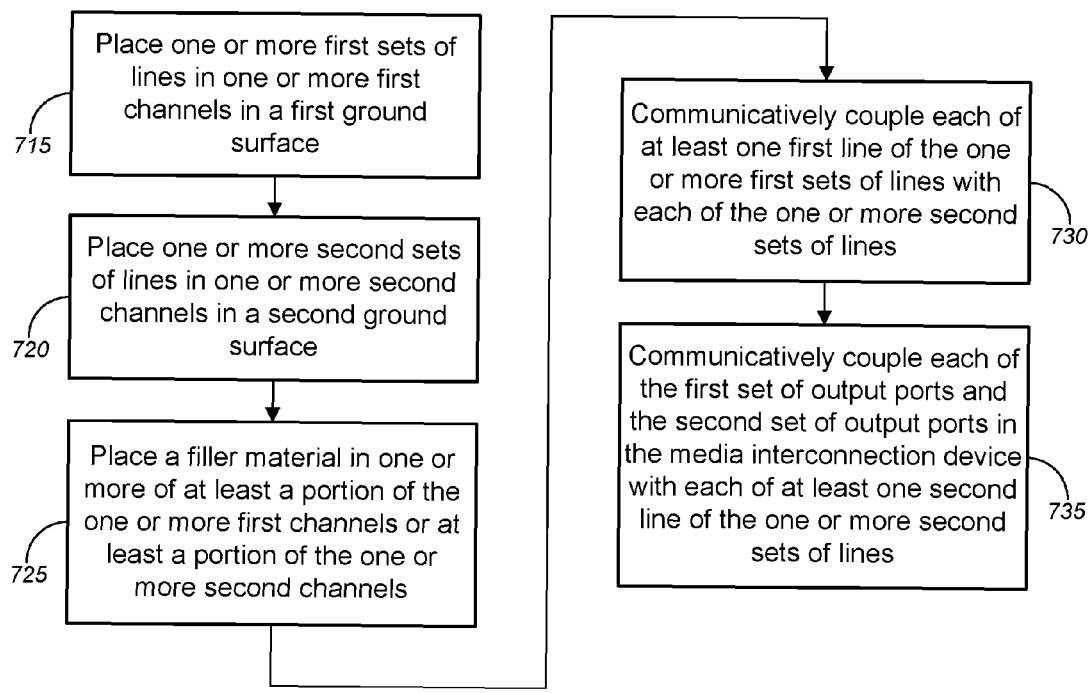

FIGS. 7A and 7B (collectively, "FIG. 7") are flow diagrams illustrating various methods 700 for implementing FTDP and/or point-to-point fiber insertion within a PON communications system (or alternatively, within an Ethernet fiber communications system, within an EPON, NGPON, or NGPON2 communications system, and/or the like) using a plurality of media interconnection devices disposed throughout a RV park, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 7 can be implemented by or with (and, in some cases, are described below with respect to) the systems 100, 200, 400, 500, and/or 600 of FIGS. 1, 2, 4, 5, and/or 6, respectively (or components thereof), such methods may also be implemented using any suitable hardware implementation. Similarly, while each of the system 100 (and/or components thereof) of FIG. 1, the system 200 (and/or components thereof) of FIG. 2, the system 400 (and/or components thereof) of FIG. 4, the system 500 (and/or components thereof) of FIG. 5, and/or the system 600 (and/or components thereof) of FIG. 6 can operate according to the method illustrated by FIG. 7 (e.g., by executing instructions embodied on a computer readable medium), the systems 100, 200, 400, 500, and/or 600 can each also operate according to other modes of operation and/or perform other suitable procedures.

In the non-limiting embodiment of FIG. 7A, method 700, at block 705, might comprise connecting one of a video cable, a telephone cable, or an Internet cable into a corresponding port in one of a first set of output ports or a second set of output ports in a MIB or media interconnection device (e.g., MIB or media interconnection device 100, 285, or 620 of FIGS. 1, 2, and 4-6 as described in detail above). Method 700 might further comprise, at block 710, connecting the one of the video cable, the telephone cable, or the Internet cable into a corresponding port in a panel of a recreational vehicle ("RV"; such as RV 215 of FIGS. 2, 4, and 6).

In some alternative embodiments, the process at block 705 might comprise connecting two or more of the video cable, the telephone cable, or the Internet cable into a corresponding port in one of a first set of output ports or a second set of output ports in a MIB or media interconnection device (e.g., MIB or media interconnection device 100, 285, or 620 of FIGS. 1, 2, and 4-6 as described in detail above). The process at block 710 might correspondingly comprise connecting the two or more of the video cable, the telephone cable, or the Internet cable into a corresponding port in the panel of the RV (such as RV 215 of FIGS. 2, 4, and 6).

Turning to FIG. 7B, prior to connecting the cables between the MIB or media interconnection device and the panel of the RV, method 700 might comprise, at block 715, placing one or more first sets of lines in one or more first channels in a first ground surface. The one or more first lines might include, without limitation, at least one of one or more first optical fiber cables, one or more first telephone cables, one or more first video cables, one or more first non-fiber Internet cables, and/or the like, which might be associated with one or more service providers. At block 720, method 700 might comprise placing one or more second sets of lines in one or more second channels in a second ground surface. The one or more second lines might include, but is not limited to, corresponding at least one of one or more second optical fiber cables, one or more second telephone cables, one or more second video cables, one or more second non-fiber Internet cables, one or more second conductive signal lines, one or more second power lines, and/or the like. Each of one or more second set of lines might serve each of one or more customers (e.g., RVs or RV parking slots 230 of FIG. 2). Method 700, at block 725, might comprise placing a filler material in one or more of at least a portion of the one or more first channels or at least a portion of the one or more second channels. In some embodiments, the filler material might include a thermosetting material or the like. In some cases, the thermosetting material might include, without limitation, polyurea or the like.

According to some embodiments, at least a portion of the first ground surface might be (or might include) a roadway surface, while at least a portion of the second ground surface might be (or might include) one of a roadway surface or a non-roadway surface, and at least a portion of the third ground surface might be (or might include) a non-roadway surface. The method might further comprise placing a capping material in the at least one of at least a portion of the one or more first channels or at least a portion of the one or more second channels, above the filler material. The capping material, in some cases, might serve as road lines on the roadway surface. In some embodiments, at least one channel of the one or more first channels and at least one channel of the one or more second channels is the same channel, while, in other embodiments, each of the one or more first channels and each of the one or more second channels might be different channels.

At block 730, method 700 might comprise communicatively coupling each of at least one first line of the one or more first sets of lines with each of the one or more second sets of lines, e.g., via a first cable distribution device disposed within a signal distribution device (e.g., one of signal distribution devices 265a-265c of FIGS. 2A and 3) that is disposed in a third ground surface. Method 700 might further comprise communicatively coupling each of the first set of output ports and the second set of output ports in the media interconnection device with each of at least one second line of the one or more second sets of lines (block 735).

According to some embodiments, each of the one or more first optical fiber cables might be associated with one of a passive optical network ("PON") service, a gigabit PON ("GPON") service, an Ethernet fiber line service, an Ethernet PON ("EPON") service, a next generation PON ("NGPON") service, or a second NGPON ("NGPON2") service, or the like.

Merely by way of example, in some embodiments, the signal distribution device might include, without limitation, a container that is disposed in the third ground surface, with a top portion of the container being one of substantially level with a top portion of the third ground surface or below the top portion of the third ground surface. In some cases, each of the first and second cable distribution devices might be disposed within the container. In alternative embodiments, the signal distribution device might include a container that is disposed in the third ground surface and a pedestal that is disposed above a top portion of the container. The top portion of the container might be one of substantially level with a top portion of the third ground surface or below the top portion of the third ground surface, and at least one of the first cable distribution device or the second cable distribution device is disposed within one of the container or the pedestal. In some cases, the first and second cable distribution devices might be the same cable distribution device, while, in other cases, the first and second cable distribution devices might be different cable distribution devices.

In some embodiments, each of the one or more first sets lines or the one or more second lines further might include, without limitation, one or more of at least one conduit, at least one conductive signal line, at least one power line via the signal distribution device, and/or the like. In some instances, the at least one conductive signal line might include, but is not limited to, at least one of one or more data cables (separate from the one or more non-fiber Internet cables above), one or more second video cables (separate from the one or more video cables above), one or more voice cables (separate from the one or more telephone cables above), and/or the like.

According to some embodiments, the signal distribution device might include a fiber distribution hub ("FDH"). The one or more first lines might communicatively couple at least one of a central office or a digital subscriber line access multiplexer ("DSLAM") of a telecommunications service provider with the FDH, and the one or more second lines might communicatively couple the FDH with a network access point ("NAP") (which might include an above-surface NAP, a direct bury NAP, or a NAP disposed in the ground surface and extending above the ground surface, or the like). Alternatively, the signal distribution device might include a NAP, and the one or more first lines might communicatively couple the NAP with a FDH, in which case, the one or more second lines might communicatively couple the NAP with one or more network interface devices ("NIDs") each disposed on an exterior surface of a customer premises of the plurality of customer premises or with one or more MIBs or media interconnection devices (e.g., MIBs 100, 285, or 620 that may be disposed in between two or more RVs or the like in a bulk service application site, e.g., a RV park or the like, as shown with respect to FIGS. 2, 4, and 5). In some cases, the one or more NIDs or one or more MIBs might include one or more optical network terminals ("ONTs"). In some instances, each of the one or more second sets of lines might include eight main optical fiber lines and four spare optical fiber lines, and communicatively coupling each of the at least one third optical fiber line with each of the at least one second optical fiber line might comprise communicatively coupling each of the at least one third optical fiber line with each of one or more of the four spare optical fiber lines, as described in further detail in the '851 Application.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A media interconnection device, comprising:
a waterproof and weather-resistant container comprising an external housing and an external lid;
an inner compartment disposed within the external housing, the inner compartment comprising an inner lid;
a first set of media connectors disposed within the external housing, the first set of media connectors comprising a first set of output ports;
a second set of media connectors disposed within the external housing, the second set of media connectors comprising a second set of output ports; and
a set of input cables disposed within the inner compartment and communicatively coupled to each of the first set of media connectors and the second set of media connectors, wherein the first set of media connectors and the second set of media connectors are demarcation points between one or more service provider networks and at least two separate customer networks communicatively coupled to the first set of output ports and the second set of output ports, respectively,
wherein the set of input cables comprises one or more telephone cables, wherein the first set of output ports comprises a telephone output port communicatively coupled via the first set of media connectors to a first telephone cable of the one or more telephone cables, wherein the second set of output ports comprises a telephone output port communicatively coupled via the second set of media connectors to a second telephone cable of the one or more telephone cables, and
wherein each of the first and second telephone cables is communicatively coupled with a private branch exchange ("PBX") that tracks local and long-distance usage over at least one of the first and second telephone cables by a corresponding user associated with at least one of the at least two separate customer networks corresponding to the at least one of the first and second telephone cables.

2. The media interconnection device of claim 1, wherein the set of input cables further comprises one or more video cables and one or more Internet cables, wherein the first set of output ports further comprises a video output port communicatively coupled via the first set of media connectors to a first video cable of the one or more video cables and an Internet output port communicatively coupled via the first set of media connectors to a first Internet cable of the one or more Internet cables, wherein the second set of output ports further comprises a video output port communicatively coupled via the second set of media connectors to a second video cable of the one or more video cables and an Internet output port communicatively coupled via the second set of media connectors to a second Internet cable of the one or more Internet cables.

3. The media interconnection device of claim 2, wherein the one or more Internet cables are communicatively coupled to an optical network terminal ("ONT"), which is communicatively coupled via at least one optical fiber line that is associated with one of a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service.

4. The media interconnection device of claim 3, wherein the at least one optical fiber line communicatively couples via a signal distribution device with one or more lines of an apical conduit system that are disposed in one or more channels in a ground surface.

5. The media interconnection device of claim 3, wherein the ONT is located within the external housing.

6. The media interconnection device of claim 3, wherein the ONT is located within a second external housing between the media interconnection device and a signal distribution device servicing the ONT, wherein the second external housing is one of disposed above ground or disposed underground.

7. The media interconnection device of claim 2, wherein each of the first and second video cables is communicatively coupled with a video signal decoder, wherein the video signal decoder decodes a scrambled video signal from a video service provider and sends a decoded video signal through one of the first video cable or the second video cable when a user associated with a corresponding one of the at least two separate customer networks in communication with the one of the first video cable or the second video cable subscribes to video service.

8. The media interconnection device of claim 7, wherein the video signal decoder is located within the external housing.

9. The media interconnection device of claim 7, wherein the video signal decoder is located within a separate housing located within a video signal distribution hub that is located at a local site.

10. The media interconnection device of claim 1, wherein the PBX is located at a local site.

11. The media interconnection device of claim 1, wherein the set of input cables comprises at least two of one or more video cables, one or more telephone cables, or one or more Internet cables.

12. The media interconnection device of claim 1, wherein the set of input cables comprises one or more Internet cables that provides Internet service and at least one of Internet-based video service or Voice over Internet Protocol ("VoIP") service to one or more of the at least two separate customer networks.

13. The media interconnection device of claim 1, wherein the external housing is mounted on a post that is set in the ground between two adjacent parking slots of a recreational vehicle ("RV") park.

14. The media interconnection device of claim 13, wherein a first customer network of the at least two separate customer networks comprises a first local area network ("LAN") located within a first RV that is parked in one of the two adjacent parking slots, and wherein a second customer network of the at least two separate customer networks comprises a second LAN located within a second RV that is parked in the other one of the two adjacent parking slots.

15. A communications system, comprising:
an apical conduit system, comprising:
one or more first sets of lines disposed in one or more first channels in a first ground surface, the one or more first sets of lines being associated with at least one of one or more service providers or one or more services;
one or more second sets of lines disposed in one or more second channels in a second ground surface, at least two sets of lines of the one or more second sets of lines serving each media interconnection device of a plurality of media interconnection devices located at a first site; and
a filler material disposed around at least one of the one or more first sets of lines in at least a portion of the one or more first channels or around at least one of the one or more second sets of lines in at least a portion of the one or more second channels; and
a signal distribution device, comprising:
a container disposed in a third ground surface, a top portion of the container being one of substantially level with a top portion of the third ground surface or below the top portion of the third ground surface; and
a cable distribution device disposed within the signal distribution device and configured to communicatively couple each of at least one first set of lines of the one or more first sets of lines with each of the one or more second sets of lines; and
the plurality of media interconnection devices located at the first site, each media interconnection device comprising:
a waterproof and weather-resistant container comprising an external housing and an external lid;
an inner compartment disposed within the external housing, the inner compartment comprising an inner lid;
a first set of media connectors disposed within the external housing, the first set of media connectors comprising a first set of output ports;
a second set of media connectors disposed within the external housing, the second set of media connectors comprising a second set of output ports; and
a set of input cables disposed within the inner compartment and communicatively coupled to each of the first set of media connectors and the second set of media connectors, wherein the first set of media connectors and the second set of media connectors are demarcation points between one or more service provider networks and at least two separate customer networks communicatively coupled to the first set of output ports and the second set of output ports, respectively, wherein the set of input cables communicatively couples with the at least two sets of lines of the one or more second sets of lines.

16. The communications system of claim 15, wherein the set of input cables comprises one or more video cables, one or more telephone cables, and one or more Internet cables, wherein the first set of output ports comprises a video output port communicatively coupled via the first set of media connectors to a first video cable of the one or more video cables, a telephone output port communicatively coupled via the first set of media connectors to a first telephone cable of the one or more telephone cables, and an Internet output port communicatively coupled via the first set of media connectors to a first Internet cable of the one or more Internet cables, wherein the second set of output ports comprises a video output port communicatively coupled via the second set of media connectors to a second video cable of the one or more video cables, a telephone output port communicatively coupled via the second set of media connectors to a second telephone cable of the one or more telephone cables, and an Internet output port communicatively coupled via the second set of media connectors to a second Internet cable of the one or more Internet cables.

17. The communications system of claim 15, wherein the signal distribution device comprises a fiber distribution hub ("FDH"), wherein the one or more first sets of lines communicatively couple at least one of a central office or a digital subscriber line access multiplexer ("DSLAM") of a telecommunications service provider with the FDH, wherein the one or more second sets of lines communicatively couple the FDH with a network access point ("NAP").

18. The communications system of claim 15, wherein the fiber distribution hub comprises a pedestal disposed above the top portion of the container, and wherein at least one of the first cable distribution device or the second cable distribution device is disposed within one of the container or the pedestal.

19. The communications system of claim 15, wherein the signal distribution device comprises a network access point ("NAP"), wherein the one or more first sets of lines communicatively couple the NAP with a fiber distribution hub ("FDH"), wherein the one or more second sets of lines communicatively couple the NAP with one or more media interconnection devices of the plurality of media interconnection devices.

20. The communications system of claim 19, wherein the NAP comprises a direct bury NAP disposed below the top portion of the third ground surface.

21. The communications system of claim 19, wherein the NAP comprises a NAP disposed within one of a hand hole or a flowerpot hand hole that is at least partially disposed below the third ground surface.

22. The communications system of claim 19, wherein the one or more media interconnection devices comprise at least one optical network terminal ("ONT").

23. The communications system of claim 15, wherein each of the one or more first sets of lines is associated with one of a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service.

24. The communications system of claim 15, wherein at least a portion of the first ground surface is a roadway surface, wherein at least a portion of the second ground surface is one of a roadway surface or a non-roadway surface, and wherein at least a portion of the third ground surface is a non-roadway surface.

25. The communications system of claim 15, wherein at least one channel of the one or more first channels and at least one channel of the one or more second channels is the same channel.

26. The communications system of claim 15, wherein each media interconnection device is mounted on a post that is set in the ground between two adjacent parking slots of a recreational vehicle ("RV") park.

27. A method, comprising:
connecting one of a video cable, a telephone cable, or an Internet cable into a corresponding port in one of a first set of output ports or a second set of output ports in a media interconnection device, the media interconnection device comprising:
a waterproof and weather-resistant container comprising an external housing and an external lid;
an inner compartment disposed within the external housing, the inner compartment comprising an inner lid;
a first set of media connectors disposed within the external housing, the first set of media connectors comprising the first set of output ports;
a second set of media connectors disposed within the external housing, the second set of media connectors comprising the second set of output ports; and
a set of input cables disposed within the inner compartment and communicatively coupled to each of the first set of media connectors and the second set of media connectors, wherein the first set of media connectors and the second set of media connectors are demarcation points between one or more service provider networks and at least two separate customer networks communicatively coupled to the first set of output ports and the second set of output ports, respectively, wherein the set of input cables communicatively couples with the at least two sets of lines of the one or more second sets of lines; and
connecting the one of the video cable, the telephone cable, or the Internet cable into a corresponding port in a panel in a recreational vehicle ("RV").

28. The method of claim 27, wherein the set of input cables comprises one or more video cables, one or more telephone cables, and one or more Internet cables, wherein the first set of output ports comprises a video output port communicatively coupled via the first set of media connectors to a first video cable of the one or more video cables, a telephone output port communicatively coupled via the first set of media connectors to a first telephone cable of the one or more telephone cables, and an Internet output port communicatively coupled via the first set of media connectors to a first Internet cable of the one or more Internet cables, wherein the second set of output ports comprises a video output port communicatively coupled via the second set of media connectors to a second video cable of the one or more video cables, a telephone output port communicatively coupled via the second set of media connectors to a second telephone cable of the one or more telephone cables, and an Internet output port communicatively coupled via the second set of media connectors to a second Internet cable of the one or more Internet cables.

29. The method of claim 27, wherein the one or more Internet cables are communicatively coupled to an optical network terminal ("ONT"), which is communicatively coupled via at least one optical fiber line that is associated with one of a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service.

* * * * *